United States Patent
Liu et al.

(10) Patent No.: US 10,004,030 B2
(45) Date of Patent: Jun. 19, 2018

(54) DEVICE, NETWORK, AND METHOD FOR NETWORK ADAPTATION AND UTILIZING A DOWNLINK DISCOVERY REFERENCE SIGNAL

(71) Applicant: Futurewei Technologies, Inc., Plano, TX (US)

(72) Inventors: Jialing Liu, Palatine, IL (US); Weimin Xiao, Hoffman Estates, IL (US); Qian Cheng, Aurora, IL (US); Vipul Desai, Palatine, IL (US)

(73) Assignee: Futurewei Technologies, Inc., Plano, TX (US)

( * ) Notice: Subject to any disclaimer, the term of this patent is extended or adjusted under 35 U.S.C. 154(b) by 150 days.

(21) Appl. No.: 14/610,703

(22) Filed: Jan. 30, 2015

(65) Prior Publication Data

US 2015/0223149 A1 Aug. 6, 2015

Related U.S. Application Data

(60) Provisional application No. 61/934,535, filed on Jan. 31, 2014.

(51) Int. Cl.
  *H04W 48/12* (2009.01)
  *H04W 56/00* (2009.01)
  (Continued)

(52) U.S. Cl.
  CPC .............. *H04W 48/12* (2013.01); *H04L 5/00* (2013.01); *H04W 24/08* (2013.01);
  (Continued)

(58) Field of Classification Search
  CPC ..... H04W 48/12; H04W 24/08; H04W 24/10; H04W 56/0015; H04W 36/0066; H04W 56/16
  (Continued)

(56) References Cited

U.S. PATENT DOCUMENTS 9,749,938 B2    8/2017  Cheng et al.
2010/0260169 A1 10/2010 Gheorghiu et al.
(Continued)

FOREIGN PATENT DOCUMENTS

WO    2011066325 A1    6/2011
WO    2011123809 A1   10/2011

OTHER PUBLICATIONS

NEC (Small cell on/off mechanism and discovery signal), Nov. 11-15, 2013, six (6) pages.*
(Continued)

*Primary Examiner* — Jae Y Lee
*Assistant Examiner* — Jean F Voltaire
(74) *Attorney, Agent, or Firm* — Slater Matsil, LLP

(57) ABSTRACT

System and method embodiments are provided for network adaption and utilization of a discovery signal (DS). In an embodiment, a method in a UE for communicating in a wireless network includes receiving a parameter(s) from a network controller, wherein the parameter provides the UE with an activation time frame within which the UE can expect to receive a common reference signal (CRS) from a network component, a deactivation time frame within which the UE is not to expect to receive the CRS, and information for receiving and processing a DS from the network component; receiving the DS from the network component, wherein a structure and format of the DS conforms to the parameter received by the UE; refraining from attempting to perform CRS based procedures when the CRS is not received; and performing one of synchronization, cell identification, and DS based radio resource management (RRM) measurements according to the DS.

29 Claims, 10 Drawing Sheets

(51) Int. Cl.
*H04W 24/08* (2009.01)
*H04L 5/00* (2006.01)
*H04W 24/10* (2009.01)
*H04W 48/16* (2009.01)
*H04W 36/00* (2009.01)
*H04W 52/02* (2009.01)

(52) U.S. Cl.
CPC ........ *H04W 56/0015* (2013.01); *H04W 24/10* (2013.01); *H04W 36/0066* (2013.01); *H04W 48/16* (2013.01); *H04W 52/0206* (2013.01); *Y02D 70/00* (2018.01); *Y02D 70/1262* (2018.01); *Y02D 70/142* (2018.01); *Y02D 70/144* (2018.01); *Y02D 70/24* (2018.01)

(58) Field of Classification Search
USPC ........................................................ 370/252
See application file for complete search history.

(56) References Cited

U.S. PATENT DOCUMENTS

| | | |
|---|---|---|
| 2012/0020310 A1 | 1/2012 | Ji et al. |
| 2012/0149351 A1 | 6/2012 | Kalbag |
| 2012/0213109 A1 | 8/2012 | Xu et al. |
| 2013/0079048 A1 | 3/2013 | Cai et al. |
| 2014/0016488 A1 | 1/2014 | Xu et al. |
| 2014/0036737 A1* | 2/2014 | Ekpenyong ........... H04W 8/245 370/280 |
| 2014/0171073 A1 | 6/2014 | Kim et al. |
| 2015/0023191 A1 | 1/2015 | Kim et al. |
| 2015/0092768 A1* | 4/2015 | Ng ....................... H04W 48/16 370/350 |

OTHER PUBLICATIONS

NEC (Small cell on/off mechanism and discovery signal, dated Nov. 11-15, 2013).*
"Small Cell Discovery for Efficient Small Cell On/Off Operation," Source: NTT DOCOMO, Agenda Item: 7.2.6.1.2, Document for: Discussion and Decision, 3GPP TSG RAN WG1 Meeting #74, R1-133457, Barcelona, Spain, Aug. 19-23, 2013, 8 pages.
"Small Cell On/Off Mechanism and Discovery Signal," Agenda Item: 6.2.6.2, Source: NEC, Document for: Discussion, 3GPP TSG RAN WG1 Meeting #75, R1-135262, San Francisco, USA, Nov. 11-15, 2013, 6 pages.
"Discussion on RRM Measurement Procedures in Small Cell On/Off Operation," Agenda Item: 6.2.3.2.4, Source: Sony, Document for: Discussion, 3GPP TSG RAN WG1 Meeting #77, R1-142474, Seoul, Korea, Mar. 19, 2014 through Apr. 23, 2014, 6 pages.
"Discussion on Network Assistance Signaling for Small Cell Discovery," Agenda Item: 7.2.1.2.3, Source: Huawei, HiSilicon, Document for: Discussion/Decision, 3GPP TSG RAN WG1 Meeting #78, R1-142828, Dresden, Germany, Aug. 18-22, 2014, 6 pages.
"Discussion on Small Cell on/off Transition Time Reduction Procedure," Source: Panasonic, Agenda Item: 6.2.6.2, Document for: Discussion and Decision, 3GPP TSG RAN WG1 Meeting #75, R1-135397, Nov. 11-15, 2013, 4 pages.
"Small Cell Semi-Static ON/OFF with a Discovery Signal," Agenda Item: 6.2.6.2, Source: Broadcam Corporation, Document for: Discussion and Decision, 3GPP TSG-RAN WG1 Meeting #75, R1-135539, Nov. 11-15, 2013, 4 pages.
"Indication of Cell Trasmission to UEs," Source: Hitachi Ltd., Agenda Item: 6.2.3.2.1, Document for: Discussion/Decision, 3GPP TSG-RAN WG1 #77, R1-142248, May 19-23, 2014, 4 pages.
"3rd Generation Partnership Project; Technical Specification Group Radio Access Network; Evolved Universal Terrestrial Radio Access (E-UTRA); Pyhsical Channels and Modulation, (Release 12)," 3GPP TS 36.211, V12.4.0, Dec. 2014, 124 pages.
"3rd Generation Partnership Project; Technical Specification Group Radio Access Network; Evolved Universal Terrestrial Radio Access (E-UTRA); Physical Layer Procedures, (Release 12)," 3GPP TS 36.213, V12.4.0, Dec. 2014, 225 pages.
"3rd Generation Partnership Project; Technical Specification Group Radio Access Network; Evolved Universal Terrestrial Radio Access (E-UTRA) and Evolved Universal Terrestrial Radio Access Network; (E-UTRAN); Overall Description; Stage 2, (Release 12)," 3GPP TS 36.300, V12.4.0, Dec. 2014, 251 pages.
"3rd Generation Partnership Project; Technical Specification Group Radio Access Network; Evolved Universal Terrestrial Radio Access (E-UTRA); Radio Resource Control (RRC); Protocol Specification, (Release 12)," 3GPP TS 36.331, V12.4.1, Dec. 2014, 410 pages.
International Search Report and Written Opinion of the International Searching Authority received in Patent Cooperation Treaty Application No. PCT/US15/13945 dated Apr. 30, 2015, 9 pages.
International Search Report and Written Opinion of the International Searching Authority received in Patent Cooperation Treaty Application No. PCT/US2015/013983, dated Jun. 22, 2015, 17 pages.

* cited by examiner

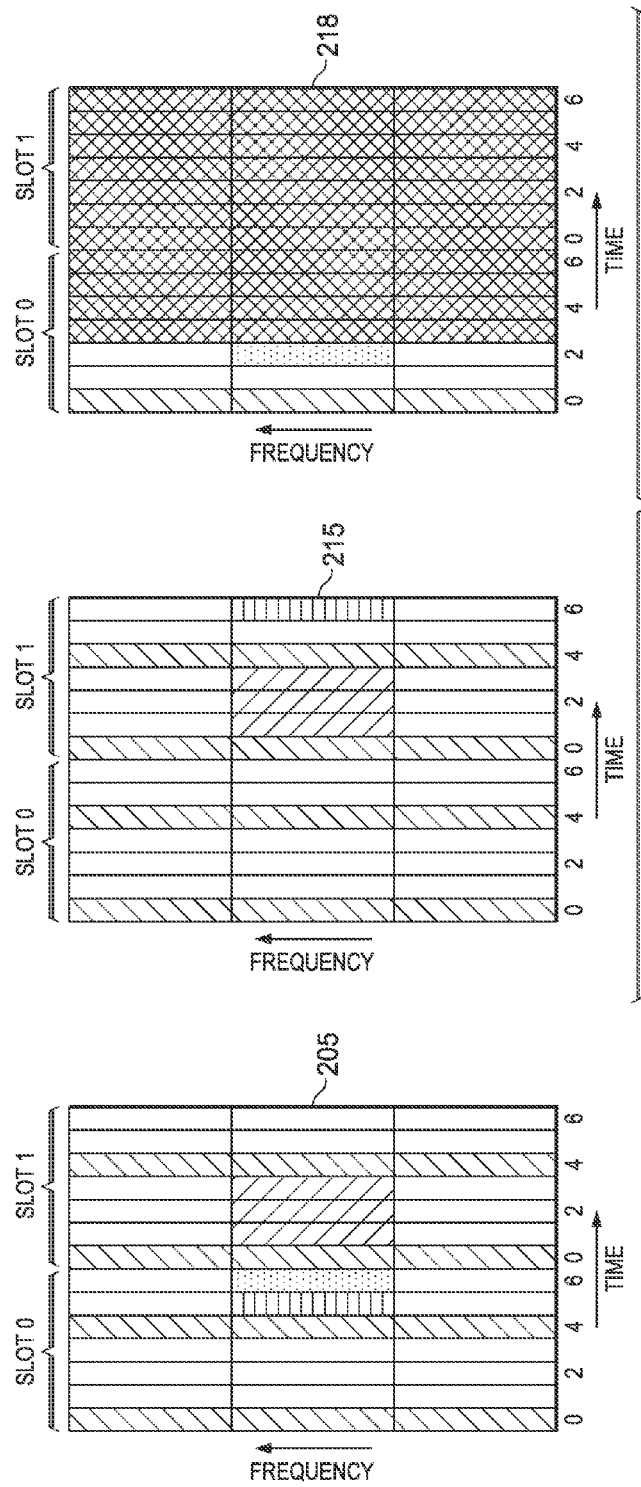

DEVICE, NETWORK, AND METHOD FOR NETWORK ADAPTATION AND UTILIZING A DOWNLINK DISCOVERY REFERENCE SIGNAL

This application claims the benefit of U.S. Provisional Application No. 61/934,535, filed on Jan. 31, 2014, which application is hereby incorporated herein by reference.

TECHNICAL FIELD

The present invention relates to a device, network, and method for wireless communications, and, in particular embodiments, to a device and method for network adaptation and utilizing a downlink discovery reference signal.

BACKGROUND

The amount of wireless data being transferred is expected to exceed that of wired data, pushing the limits of macro cellular deployment. Small cell deployment may be used to help handle this increase in data capacity, while meeting customer quality of service expectations and operators' requirements for cost-effective service delivery.

Small cells generally are low-power wireless access points that operate in a licensed spectrum. Small cells provide improved cellular coverage, capacity and applications for homes and businesses, as well as metropolitan and rural public spaces. Different types of small cells include, generally from smallest size to largest size, femtocells, picocells, and microcells.

SUMMARY

In an embodiment, a method for communicating in a wireless network includes receiving at least one configuration parameter from a network controller comprising information related to an activation time frame, a deactivation time frame, and a discovery signal (DS) parameter; listening for a common reference signal (CRS) during the activation time frame; receiving a DS that conforms to the DS parameter; refraining from attempting to perform CRS based procedures when the CRS is not received; and performing at least one of synchronization, cell identification, and DS based radio resource management (RRM) measurements according to the DS.

In an embodiment, a method in a network component for communicating with user equipment (UEs) includes receiving, at the network component, at least one discovery signal (DS) transmission parameter; generating, by the network component, a DS according to the at least one DS transmission parameter; and transmitting, by the network component, the DS to the UE, wherein the DS enables the UE to make DS-based radio resource management (RRM) measurements according to the DS, wherein the DS is transmitted during both an off state and an on state of the network component, wherein only the DS is transmitted by the network component when the network component is in the off state, and wherein the DS is transmitted not more frequently than once every other subframe.

In an embodiment, a wireless device for communicating in a wireless network includes a receiver configured to receive configuration parameters from a network controller and to receive a discovery signal (DS) from a network component; and a processor and memory coupled to the receiver, wherein the processor and memory are configured to refrain from performing common reference signal (CRS) procedures during times specified by the configuration parameters, wherein the processor and memory are configured to perform at least one of synchronization, cell identification, and DS based radio resource management (RRM) measurements according to the DS and according to the configuration parameters, and wherein the configuration parameters instruct the wireless device to expect the DS in a time frame of less than every subframe.

In an embodiment, a network component in a wireless network for providing network access to a user equipment (UE) includes a transmitter configured to send a discovery signal (DS) and a common reference signal (CRS) to the UE; a receiver configured to receive at least one discovery signal (DS) transmission parameter; and a processor and memory coupled to the transmitter and the receiver, wherein the processor and memory are configured to cause the transmitter to send the CRS only when the network component is in an on state and is in an active state for the UE according to the configuration and activation signaling, wherein the processor generates the DS according to the DS transmission parameter, wherein the processor and memory are configured to cause the transmitter to send the DS to the UE when the network component is in the on state and when the network component is in the off state, wherein the processor and memory are configured to cause the transmitter to refrain from sending any signal other than the DS when the network component is in the off state, wherein the processor and memory are configured to cause the transmitter to transmit the DS to the UE not more frequently than once every other subframe, and wherein the processor and memory are configured to cause the transmitter to transmit the CRS to the UE every subframe when the network component is in the on state and the network component is in the active state for the UE.

In an embodiment, a network controller to coordinate communications between user equipment (UE) and a network component includes a transmitter configured to signal the UE and the network component; and a processor and memory coupled to the transmitter, wherein the processor and memory are configured to cause the transmitter to send the UE configuration information that provides the UE with an active time frame within which the UE is to expect a common reference signal (CRS) from a network component, a deactivation time frame within which the UE is not to expect the CRS, and information for receiving and processing a discovery signal (DS) from the network component, wherein the processor and memory are further configured to cause the transmitter to send network component transmit parameters to the network component, wherein the transmit parameters include an on/off parameter, an activation/deactivation parameter, and a at least one discovery signal (DS) transmitter parameter from which the network component generates a DS, wherein the transmit parameters instruct the network component to no signals except the DS during time periods in which the network controller specifies the network component to be in an off state.

BRIEF DESCRIPTION OF THE DRAWINGS

For a more complete understanding of the present invention, and the advantages thereof, reference is now made to the following descriptions taken in conjunction with the accompanying drawing, in which:

FIG. 2B illustrates an example embodiment of a frame structure for a frequency division duplexing (FDD) configuration and a time division duplexing (TDD) configuration;

FIG. 2C illustrates an example embodiment of an OFDM subframe for FDD configuration;

FIG. 2D illustrates an example embodiment of an OFDM subframe for TDD configuration;

DETAILED DESCRIPTION OF ILLUSTRATIVE EMBODIMENTS

Figure 1A:
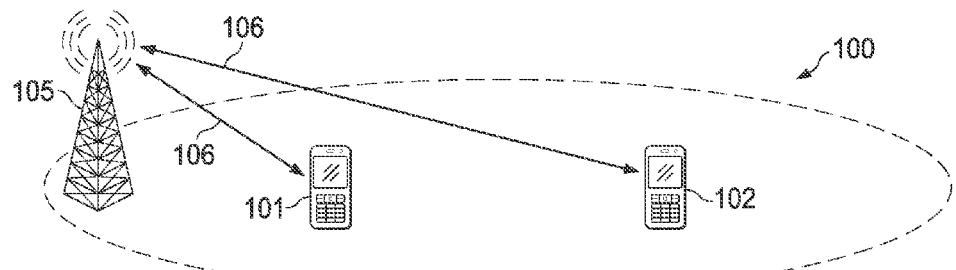
FIG. 1A illustrates an example embodiment of cellular communications in a macro cell.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Typically, in a modern wireless communications system, such as a Third Generation Partnership Project (3GPP) Long Term Evolution (LTE) compliant communications system, a plurality of cells or evolved NodeBs (eNB) (also commonly referred to as NodeBs, base stations (BSs), base terminal stations, communications controllers, network controllers, controllers, access points (APs), and so on) may be arranged into a cluster of cells, with each cell having multiple transmit antennas. Additionally, each cell or eNB may be serving a number of users (also commonly referred to as User Equipment (UE), wireless device, mobile stations, users, subscribers, terminals, and so forth) based on a priority metric, such as fairness, proportional fairness, round robin, and the like, over a period of time. It is noted that the terms cell, transmission points, and eNB may be used interchangeably. Distinction between cells, transmission points, and eNBs will be made where needed.

In legacy systems, a common reference signal (CRS) is transmitted in every subframe from a cell (e.g., an eNB). A UE monitors the CRS in every subframe. Many operations are built upon these assumptions. A missing CRS (e.g., the cell is turned off and not broadcasting the CRS) can cause unknown UE behavior. In some instances, it may cause the UE to disconnect or abort data transmission/reception. However, it has been found transmission of the CRS and other signals by a cell can cause unwanted interference in some UEs or other devices in the network. Consequently, disclosed herein is a system and method for suspending transmission of the CRS and other signals in certain circumstances. In order to prevent unwanted UE behavior, a network controller signals the UE when to expect the CRS and when not to expect the CRS. The network controller also instructs the UE to expect a discovery signal (DS) from a cell. The DS provides some of the features of the CRS, but is transmitted much less frequently. Thus, a cell can be turned off when not needed and only the transmission of the DS is performed during the off state. This has been found to significantly reduce interference experienced by other devices in the network as well as save power in the cell node (e.g., eNB).

Thus, disclosed herein is a DS (also referred to as a discovery reference signal (DRS) and the two terms are used interchangeably throughout this disclosure) that is not transmitted in every subframe, but only once in a while. In some embodiments, the DS is transmitted periodically. The instances in which the DS is transmitted are DS bursts (also referred to as DS occasions). A DS burst is indicated in a discovery measurement timing configuration (DMTC). A network controller in the network signals configuration parameters to the UE regarding when to expect a DS and other information about the DS. The timing information includes a time period between successive transmissions of the DS, on offset of the DS within that time period. The configuration parameters sent to the UE may also include activation/deactivation signaling instructing the UE when to expect the CRS from the cell. The UE refrains from attempting to perform CRS based processes during times when no CRS is received. In an embodiment, the UE refrains from attempting to perform CRS based processes during times in which the cell is inactive for the UE and only performs CRS based processes during the activation period for the cell. Based on the time between successive transmission of the DS, the offset, and/or the duration of the DS, the UE may suspend reception of signals on one carrier resource and receive signals on a different carrier resource. The reception of the signals on the different carrier resource may occur in a gap in transmissions on the first carrier resource. For example, during a gap in receiving the DS, the UE may suspend reception on the carrier radio resource on which the DS is received and receive signals on a different carrier radio resource. The UE may perform measurements or other procedures on the signals received on the different carrier radio resource. In another example, based on the time period between successive transmission of the DS and the offset within the time period, the UE may suspend reception of signaling on a first carrier radio resource and begin reception of the DS on a different second carrier radio resource during the gap in reception of the signaling on the first carrier radio resource.

In an embodiment, the eNB using cell on/off may adaptively turn the downlink transmission of a cell on and off. A cell whose downlink transmission is turned off may be configured as a deactivated secondary cell (SCell) for a UE. A cell performing on/off may transmit only periodic discovery signals (DSs) and UEs may be configured to measure the DSs for radio resource management (RRM). A UE may perform RRM measurement and may discover a cell or transmission point of a cell based on DSs when the UE is configured with DS-based measurements.

Disclosed herein are systems and methods for allowing UEs to discover small cell (e.g., femtocells, picocells, and microcells) nodes (e.g., eNBs, APs, controllers, BSs, transmission points (TPs), etc.) even when the nodes are deactivated. In an embodiment, the deactivated nodes transmit a discovery reference signal (DRS), a.k.a. discovery signal (DS), but do not transmit any other signals. The DRS allows the UEs to discover the deactivated nodes, but because the nodes are only transmitting the DRS, interference due to the transmission of the deactivated nodes is substantially minimized. In an embodiment, the DRS is transmitted less frequently than other signals that the node would transmit when in an activated state. In an embodiment, the DRS is transmitted periodically with a long duty cycle (e.g., with a period of about 200 milliseconds or longer between DRS transmissions). In contrast, the duty cycle for other transmissions made by the node in an activated state are comparatively short (e.g., on the order of microseconds).

In one embodiment, a method in a wireless device for communicating in a wireless network includes receiving at least one configuration parameter from a network controller comprising information related to an activation time frame, a deactivation time frame, and a discovery signal (DS) parameter; listening for a common reference signal (CRS) during the activation time frame; receiving a DS that conforms to the DS parameter; refraining from attempting to perform CRS based procedures when the CRS is not received; and performing at least one of synchronization, cell identification, and DS based radio resource management (RRM) measurements according to the DS.

In one embodiment, a method in a user equipment (UE) for communicating in a wireless network includes receiving at least one configuration parameter from a network controller, wherein the at least one configuration parameter provides the UE with an activation time frame within which the UE is to expect a common reference signal (CRS) from a network component, a deactivation time frame within which the UE is not to expect the CRS, and information for receiving and processing a discovery signal (DS) from the network component; receiving the DS from the network component, wherein a structure and format of the DS conforms to the at least one configuration parameter received by the UE; refraining from attempting to perform CRS based procedures when the CRS is not received; and performing at least one of synchronization, cell identification, and DS based radio resource management (RRM) measurements according to the DS. In an embodiment, the UE suspends primary synchronization signal (PSS), secondary synchronization signal (SSS), and physical broadcast channel (PBCH) processing during times outside of the activation time frame. The may be received before reception of an activation time indicator or DS may be received after reception of a deactivation time indicator or after an expiration of a deactivation timer. The activation time frame is determined according to activation signaling. In an embodiment, a start of the deactivation time frame is determined according to one of deactivation signaling from the network controller and a deactivation timer expiry, wherein the deactivation timer is specified in the configuration parameter. A deactivation status is determined according to one of deactivation signaling from the network controller and a deactivation time expiry, wherein the deactivation time is specified in the configuration parameter. The DS is received periodically during a time period specified by the configuration parameters. In an embodiment, the time period includes a duration of one to five consecutive subframes or a duration of two to five consecutive subframes. The DS includes cell-specific reference signals on antenna port 0 in all downlink subframes and in DwPTS of all special subframes in the time period. The DS also includes a primary synchronization signal in the first subframe or the second subframe of the time period and a secondary synchronization signal in the first subframe of the period. The DS includes non-zero-power channel state information (CSI) reference signals in zero or more subframes in the time period. The UE may also set up a discovery signals measurement timing configuration (DMTC) in accordance with a period offset specified in the configuration parameters. The UE does not assume DS transmission in subframes outside a DMTC occasion.

In another embodiment, a method in a network component for communicating with user equipment (UEs) includes receiving, at the network component, at least one discovery signal (DS) transmission parameter; generating, by the network component, a DS according to the at least one DS transmission parameter; and transmitting, by the network component, the DS to the UE, wherein the DS enables the UE to make DS-based radio resource management (RRM) measurements according to the DS, wherein the DS is transmitted during both an off state and an on state of the network component, wherein only the DS is transmitted by the network component when the network component is in the off state, and wherein the DS is transmitted not more frequently than once every other subframe. The DS may be transmitted periodically. In an embodiment, the DS is not transmitted during a first part of a duty cycle and a DS burst is transmitted in a second part. The DS is transmitted according to timing information specified from the DS transmission parameter, which may be received from a network controller. In an embodiment, the DS is transmitted periodically during a time period specified by the DS transmission parameter. In an embodiment, the DS includes cell-specific reference signals on antenna port 0 in all downlink subframes and in DwPTS of all special subframes in the time period. The DS may include a primary synchronization signal in the first subframe or the second subframe of the time period. The DS may also include a secondary synchronization signal in the first subframe of the period. The DS includes non-zero-power channel state information (CSI) reference signals in zero or more subframes in the time period. The DS may also include information about at least one of time and frequency synchronization, average delay, Doppler shift, QCL, and large-scale channel fading. In an embodiment, the DS includes the CRS on antenna port 0 in all downlink subframes and in DwPTS of all special subframes in the time period, a primary synchronization signal (PSS) in a first subframe or a second subframe of the time period, and a secondary synchronization signal (SSS) in a first subframe of the time period, wherein the CRS, the PSS, and the SSS are generated using a physical cell identity. The DS may include a non-zero-power channel state information reference signals (CSI-RS) in zero or more subframes in the time period. The CSI-RS may be generated using a scrambling identity. In an embodiment, the DS includes channel state information (CSI) reference signals and a PSS/SSS/CRS corresponding to an indicated physical cell identity that are quasi co-located with respect to average delay and doppler shift. In an embodiment, the DS includes channel state information (CSI) reference signals and a PSS/SSS/CRS corresponding to an indicated physical cell identity that are quasi co-located with respect to average delay and doppler shift.

In another embodiment, a network controller to coordinate communications between user equipment (UE) and a network component includes a transmitter configured to signal the UE and the network component; and a processor and memory coupled to the transmitter, wherein the processor and memory are configured to cause the transmitter to send the UE configuration information that provides the UE with an active time frame within which the UE is to expect a common reference signal (CRS) from a network component, a deactivation time frame within which the UE is not to expect the CRS, and information for receiving and processing a discovery signal (DS) from the network component, wherein the processor and memory are further configured to cause the transmitter to send network component transmit parameters to the network component, wherein the transmit parameters include an on/off parameter, an activation/deactivation parameter, and a at least one discovery signal (DS) transmitter parameter from which the network component generates a DS, wherein the transmit parameters instruct the network component to transmit no signals except for the DS during time periods in which the network controller specifies the network component to be in an off state.

In an embodiment, if a UE supports discoverySignalsInDeactSCell-r12, and if the UE is not configured by higher layers to receive multimedia broadcast multicast services (MBMS) on a carrier frequency, and if the UE is configured with discovery-signal-based radio resource management (RRM) measurements applicable for a secondary cell on the same carrier frequency, and if the secondary cell is deactivated, the UE shall, except for discovery-signal transmission, assume that primary synchronization signal (PSS), secondary synchronization signal (SSS), physical broadcast channel (PBCH), cell-specific reference signal (CRS), physical control format indicator channel (PCFICH), physical downlink shared channel (PDSCH), physical downlink control channel (PDCCH), enhanced physical downlink control channel (EPDCCH), physical hybrid-ARQ indicator channel (PHICH), demodulation reference signal (DMRS), and channel status indicator reference signal (CSI-RS) may be not transmitted by the secondary cell until the subframe where an activation command is received for the secondary cell.

Note that physical layer signaling may also be referred to as layer 1 (L1) signaling, generally carried in (E)PDCCH, MAC layer signaling as layer 2 (L2) signaling, and RRC signaling as layer 3 (L3) signaling.

FIG. 1A shows an embodiment system 100 describing a typical wireless network with a communications controller 105 communicating using a wireless link 106 to a first wireless device 101 and a second wireless device 102. The wireless link 106 can comprise a single carrier frequency such as used typically for a time division duplex (TDD) configuration or a pair of carrier frequencies as used in a frequency division duplex (FDD) configuration. Not shown in system 100 are some of the network elements used to support the communications controller 105 such as a backhaul, management entities, etc. The transmission from a controller to a UE is called downlink (DL) transmission, and the transmission from a UE to a controller is called uplink (UL) transmission.

Figure 1B:
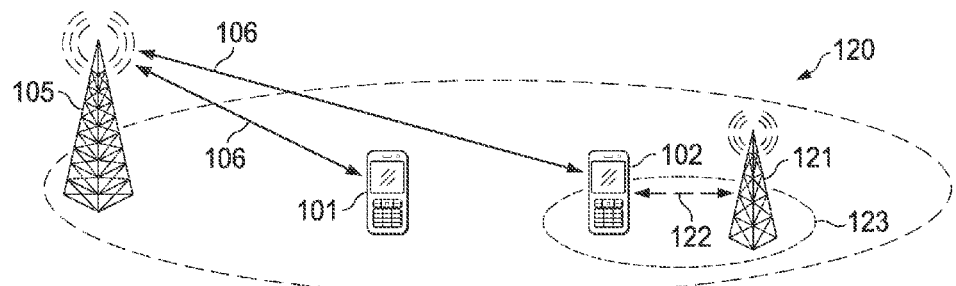
FIG. 1B illustrates an example embodiment of cellular communications in a heterogeneous network with a macro cell and a pico cell.

FIG. 1B shows an embodiment system 120 describing an example wireless heterogeneous network (HetNet) with communications controller 105 communicating to wireless device 101 using wireless link 106 (solid line) and to wireless device 102 using wireless link 106. A second communications controller 121, such as a pico cell, has a coverage area 123 and is capable of communicating to wireless device 102 using wireless link 122. Typically, wireless link 122 and wireless link 106 use the same carrier frequency, but wireless link 122 and wireless link 106 can use different frequencies. There may be a backhaul (not shown) connecting communications controller 105 and communications controller 121. A HetNet may include a macro cell and a pico cell, or generally a higher power node/antenna with a larger coverage and lower power node/antennas with a smaller coverage. Lower power nodes (or lower power points, picos, femtos, micros, relay nodes, remote radio heads (RRHs), remote radio units, distributed antennas, etc.) generally are low-power wireless access points that operate in a licensed spectrum. Small cells may use lower power nodes. Lower power nodes provide improved cellular coverage, capacity and applications for homes and businesses, as well as metropolitan and rural public spaces. In an embodiment, small cells are low-powered radio access nodes that have a range of around 10 meters to about 1 or 2 kilometers (kms). Small cells are "small" as compared to a mobile macrocell, which may have a range of a few tens kms. Examples of small cells include femtocells, picocells, and microcells.

In an embodiment network such as system 120 in FIG. 1B, there may be multiple macro points 105 and multiple pico points 121 operating with multiple component carriers, and the backhaul between any two points can be fast backhaul or slow backhaul depending on the deployment. When two points have fast backhaul, the fast backhaul may be fully utilized, e.g., to simplify the communication method and system or to improve coordination. In this network, the points configured for a UE for transmission or reception may include multiple points, some pairs of points may have fast backhaul, but some other pairs of points may have slow backhaul or the so called "any backhaul" (generally types of backhaul connections without necessarily being fast).

In an exemplary deployment, an eNodeB may control one or more cells. Multiple remote radio units may be connected to the same baseband unit of the eNodeB by fiber cable, and the latency between base band unit and remote radio unit is quite small. Therefore the same baseband unit can process the coordinated transmission/reception of multiple cells. For example, the eNodeB may coordinate the transmissions of multiple cells to a UE, which is called coordinated multiple point (CoMP) transmission. The eNodeB may also coordinate the reception of multiple cells from a UE, which is called CoMP reception. In this case, the backhaul link between these cells with the same eNodeB is fast backhaul and the scheduling of data transmitted in different cells for the UE can be easily coordinated in the same eNodeB.

As an extension of the HetNet deployment, possibly densely deployed small cells using low power nodes are considered promising to cope with mobile traffic explosion, especially for hotspot deployments in indoor and outdoor scenarios. A low-power node generally means a node whose transmission power is lower than macro node and BS classes, for example Pico and Femto eNB are both applicable. Small cell enhancements for E-UTRA and E-UTRAN, which is an ongoing study in 3GPP, will focus on additional functionalities for enhanced performance in hotspot areas for indoor and outdoor using possibly densely deployed low power nodes.

Figure 1C:
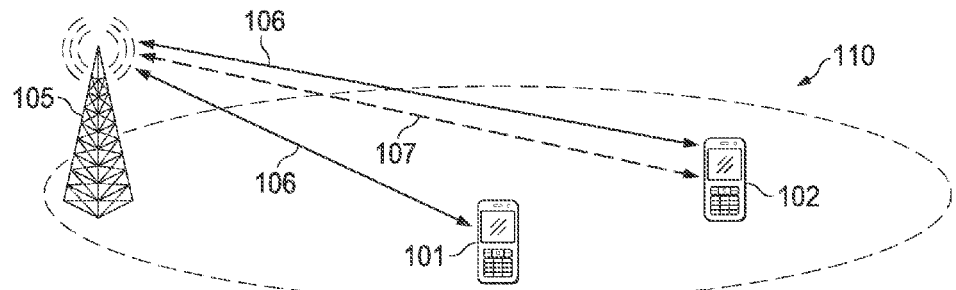
FIG. 1C illustrates an example embodiment of cellular communications in a macro cell with carrier aggregation.

FIG. 1C shows an embodiment system 110 describing a typical wireless network configured with carrier aggregation (CA) where communications controller 105 communicates to wireless device 101 using wireless link 106 (solid line) and to wireless device 102 using wireless link 107 (dashed line) and wireless link 106. In some example deployments, for wireless device 102, wireless link 106 can be called a primary component carrier (PCC) while wireless link 107 can be called a secondary component carrier (SCC). In some carrier aggregation deployments, the PCC can be provided feedback from a wireless device to a communications controller while the SCC can carry data traffic. In the 3GPP Rel-10 specification, a component carrier is called a cell. When multiple cells are controlled by a same eNodeB, cross scheduling of multiple cells is possible to be implemented because there may be a single scheduler in the same eNodeB to schedule the multiple cells. With CA, one eNB may operate and control several component carriers forming primary cell (Pcell) and secondary cell (Scell). In Rel-11 design, an eNodeB may control both a Macro cell and a Pico cell. In this case, the backhaul between the Macro cell and the Pico cell is fast backhaul. The eNodeB can control the transmission/reception of both macro cell and Pico cell dynamically.

Figure 1D:
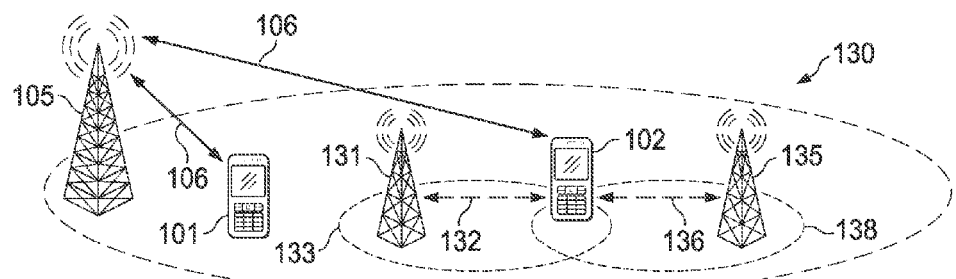
FIG. 1D illustrates an example embodiment of cellular communications in a heterogeneous network with a macro cell and several small cells.

FIG. 1D shows an embodiment system 130 that describes an example wireless heterogeneous network with communications controller 105 communicating to wireless device 101 using wireless link 106 (solid line) and to wireless device 102 using wireless link 106. A second communications controller 131, such as a small cell, has a coverage area 133 and is capable of communicating to wireless device 102 using wireless link 132. A communications controller for another small cell 135 has coverage area 138 and uses wireless link 136. Communications controller 135 is capable of communicating to wireless device 102 using wireless link 136. Coverage areas 133 and 138 may overlap. The carrier frequencies for wireless links 106, 132, and 136 may be the same or may be different.

Figure 1E:
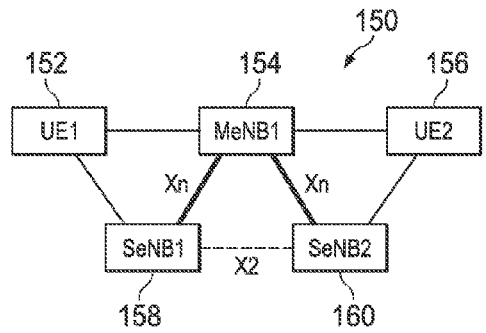
FIG. 1E illustrates an example embodiment of a dual connectivity scenario.

FIG. 1E shows an example embodiment system 150 configured for dual connectivity. A master eNB (MeNB) 154 is connected to one or more secondary eNBs (SeNBs) 158, 160 using an interface such as the Xn interface (Xn can be X2 in some specific cases). The backhaul can support this interface. Between the SeNBs 158, 160, there may be an X2 interface. A UE, such as UE1 152, is connected wirelessly to MeNB1 154 and SeNB1 158. A second UE, UE2 156, can connect wirelessly to MeNB1 154 and SeNB2 160.

In Orthogonal frequency-division multiplexing (OFDM) systems, the frequency bandwidth is divided into multiple subcarriers in frequency domain. In the time domain, one subframe is divided into multiple OFDM symbols. Each OFDM symbol may have cyclic prefix to avoid the inter-symbol interference due to multiple path delays. One resource element (RE) is defined by the time-frequency resource within one subcarrier and one OFDM symbol. A reference signal and other signals, such as data channel, e.g. physical downlink shared channel (PDSCH), and control channel, e.g. physical downlink control channel (PDCCH), are orthogonal and multiplexed in different resource elements in time-frequency domain. Further, the signals are modulated and mapped into resource elements. For each OFDM symbol, the signals in the frequency domain are transformed into the signals in time domain using, e.g., Fourier transforms, and are transmitted with added cyclic prefix to avoid the inter-symbol interference.

Figure 2A:
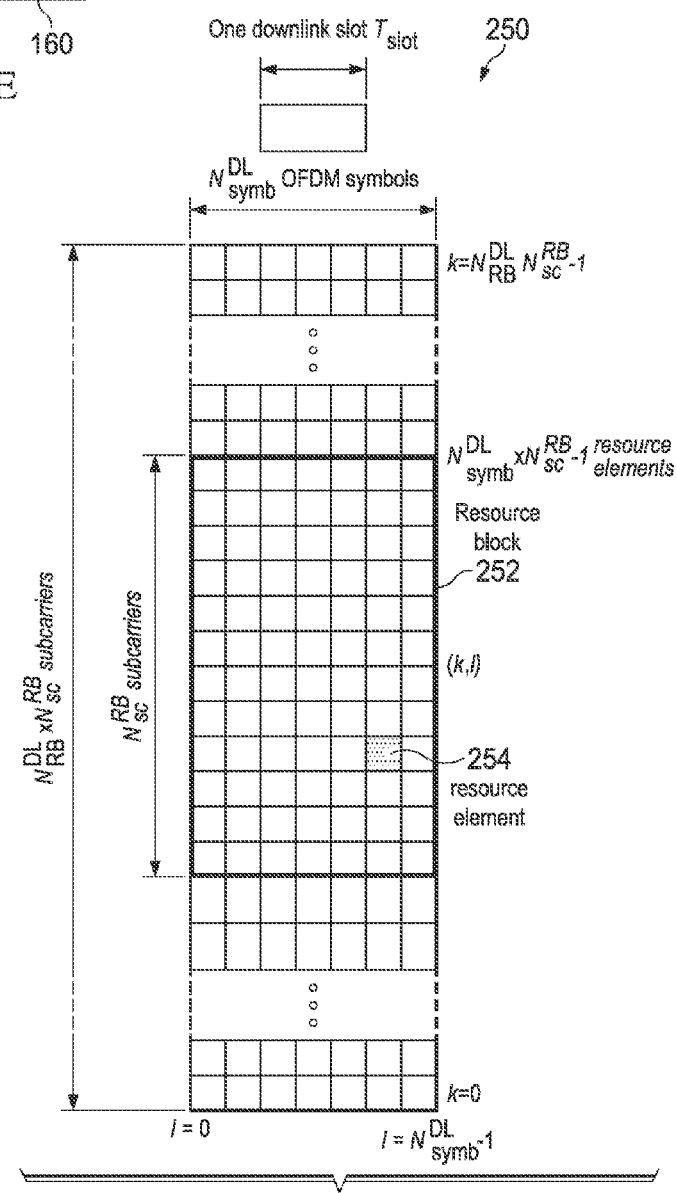
FIG. 2A illustrates example embodiment of orthogonal frequency division multiplexing (OFDM) symbols with normal cyclic prefix (CP)

Each resource block (RB) contains a number of REs. FIG. 2A illustrates an example embodiment of OFDM symbols 250 with normal cyclic prefix (CP). There are 14 OFDM symbols labeled from 0 to 13 in each subframe. The symbols 0 to 6 in each subframe correspond to even numbered slots, and the symbols 7 to 13 in each subframe correspond to odd numbered slots. In the figure, only one slot of a subframe is shown. There are 12 subcarriers labeled from 0 to 11 in each RB 252, and hence in this example, there are 12×14=168 REs 254 in a RB 252 pair (an RB 252 is 12 subcarriers by the number of symbols in a slot). In each subframe, there is a number of RBs 252, and the number may depend on the bandwidth (BW).

FIG. 2B shows an embodiment of two frame configurations used in LTE. Frame 200 is typically used for a FDD configuration, where all 10 subframes, labeled 0 through 9, communicate in the same direction (downlink in this example). Each subframe is 1 millisecond in duration and each frame is 10 milliseconds in duration. Frame 210 shows a TDD configuration where certain subframes are allocated for downlink transmissions (such as unshaded boxes (subframes 0 and 5), for uplink transmissions (vertical lines (subframe 2)), and special (dotted box (subframe 1)) which may contain both uplink and downlink transmissions. An entire subframe dedicated for downlink (uplink) transmission can be called a downlink (uplink) subframe. Subframe 6 can be either a downlink or a special subframe depending on TDD configuration. Each of the solid shaded boxes (subframes 3, 4, 7, 8, and 9) can be either a downlink subframe or an uplink subframe depending on TDD configuration. The shading used in frame 210 is exemplary but is based on the standards TSG 36.211 Rel. 11.

FIG. 2C and FIG. 2D show example embodiments of downlink subframes that are partitioned in terms of symbols and frequency. The subframe, such as subframe 205, is divided into 3 sections in the frequency domain (assuming the number of RBs is greater than 6). An analogous diagram can be shown for a 6 RBs downlink bandwidth (e.g., bandwidth of the downlink carrier).

In FIG. 2C, subframe 205 shows an example of the symbol allocation for an FDD configuration for subframes 0 and 5. The solid shading shows the symbols that have the common reference signal (CRS). The example assumes either CRS is transmitted on antenna port 0 or on antenna ports 0 and 1. The horizontal shading shows the location of the secondary synchronization signal (SSS). The dotted shading shows the location of the primary synchronization signal (PSS). Both the PSS and SSS occupy the center six resource blocks of the downlink carrier. The diagonal lines in symbols 0, 1, 2, 3, of slot 1 represent the location where the physical broadcast channel (PBCH) occupies for subframe 0. The PBCH and CRS are present in symbol 0 of slot 1. The PBCH is not transmitted in subframe 5 in Rel. 11 of the standards. Note, the PSS, SSS, and CRS can be viewed as overhead.

In FIG. 2D, subframe 215 shows an example of the symbol allocation for subframes 0 and 5 of TDD subframe 210 in FIG. 2B. Likewise, subframe 218 shows an example of the symbol allocation for subframes 1 and 6 of TDD subframe 210. In both subframe 215 and subframe 218, the solid shading shows the symbols having the CRS. The example also assumes either CRS is transmitted on antenna port 0 or on antenna ports 0 and 1. The horizontal shading in subframe 215 shows the location of the SSS. The dotted shading in subframe 218 shows the location of the PSS. Both the PSS and SSS occupy the center six RBs of the downlink carrier. The cross shading in subframe 218 indicates that the remaining symbols of the subframe are either downlink (if subframe 6 is a downlink subframe) or a combination of downlink symbols, guard time, and uplink symbols if the subframe is a special subframe. Similar to FIG. 2C, the diagonal lines in symbols 0, 1, 2, 3, of slot 1 represent the location where the PBCH occupies for subframe 0. The PBCH is not transmitted in subframe 5 in Rel. 11 of the standards. Note, the PSS, SSS, and CRS can be viewed as overhead. The information contents of the PBCH (i.e., master information block) can change every 40 ms.

Figure 2E:
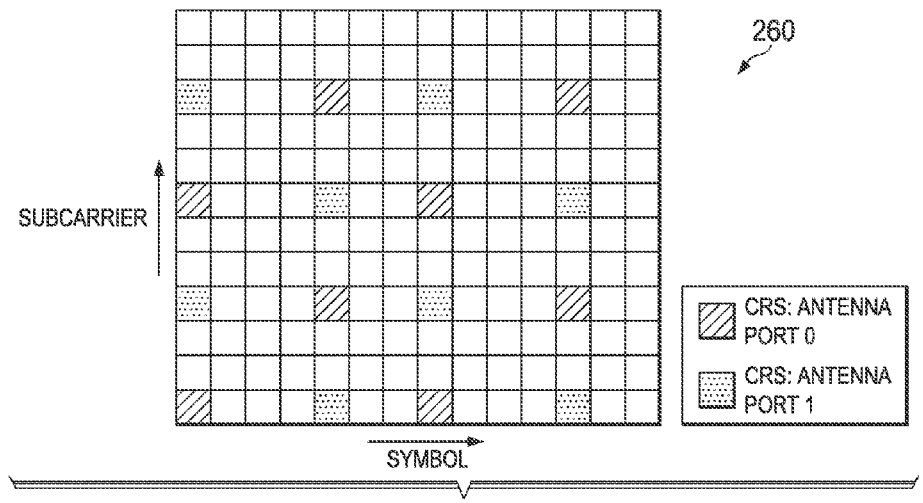
FIG. 2E illustrates an example embodiment of a common reference signal (CRS)

In downlink transmission of LTE-A system, there is reference signal 260 for UE to perform channel estimation for demodulation of PDCCH and other common channels as well as for measurement and some feedbacks, which is CRS inherited from the Rel-8/9 specification of E-UTRA, as shown in FIG. 2E. Dedicated/de-modulation reference signal (DMRS) can be transmitted together with the PDSCH channel in Rel-10 of E-UTRA. DMRS is used for channel estimation during PDSCH demodulation. DMRS can also be transmitted together with the enhanced PDCCH (EPDCCH) for the channel estimation of EPDCCH by the UE. The notation (E)PDCCH indicates EPDCCH and/or PDCCH.

Figure 2F:
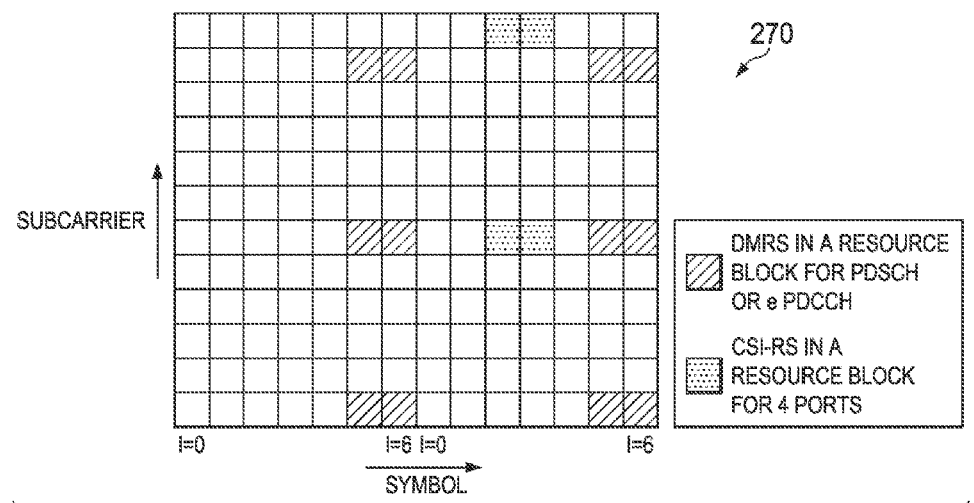
FIG. 2F illustrates an example embodiment of a channel state information-reference signal (CSI-RS) and a dedicated/de-modulation reference signal (DMRS)

In Rel-10, channel state information-reference signal (CSI-RS) 270 is introduced in addition to CRS and DMRS, as shown in FIG. 2F. CSI-RS is used for Rel-10 UEs to measure the channel status, especially for multiple antennas cases. PMI/CQI/RI and other feedback may be based on the measurement of CSI-RS for Rel-10 and beyond UE. PMI is the precoding matrix indicator, CQI is the channel quality indicator, and RI is the rank indicator of the precoding matrix. There may be multiple CSI-RS resources configured for a UE. There is specific time-frequency resource and scrambling code assigned by the eNB for each CSI-RS resource.

Figure 2G:
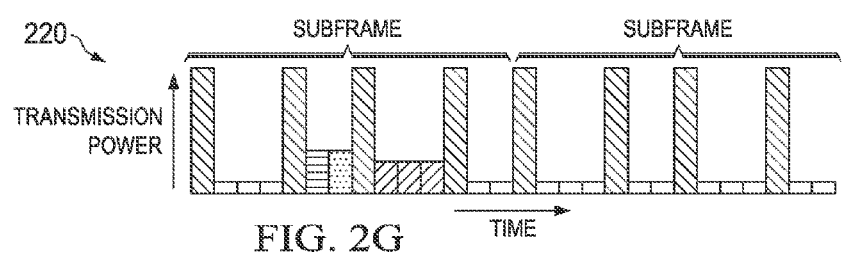
FIG. 2G illustrates an example embodiment of transmission power.

FIG. 2G shows an exemplary plot 220 of the transmission power from a communications controller, such as 105 in FIG. 1A, for a FDD configuration for subframes 0 and 1. Plot 220 shows the communication controller still transmits signals such as the CRS (solid shading), the SSS (horizontal shading), the PSS (dotted shading), and the PBCH (diagonal shading) even if there is no other data to transmit on the downlink. The transmission of these signals can increase the interference observed in a system such as in FIG. 1B even when communications controller 121 is not serving a UE such as wireless device 102. This interference can reduce the system capacity.

Figure 7:
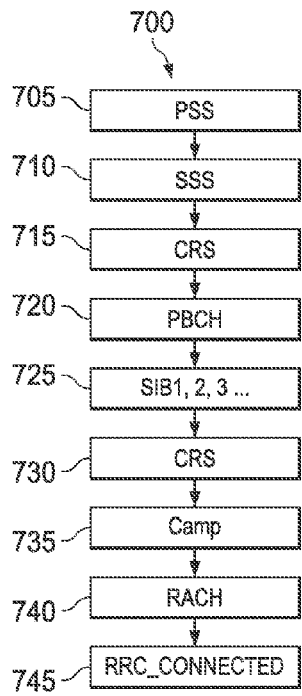
FIG. 7 illustrates an example embodiment of an access procedure.

However, eliminating these signals entirely can impair system operation. For example, a wireless device relies on these signals to synchronize (both time and frequency) and the make measurements. One example how a wireless device uses these signals is presented using some of the steps of flowchart 700 in FIG. 7. The wireless device first detects the transmitted PSS in step 705. The wireless device can then detect the SSS in step 710. Having both the PSS and SSS provides the wireless device information such as: 1) frame configuration (FDD or TDD); 2) cyclic prefix used for certain downlink subframes; 3) the cell id; 4) the location of subframe 0. In addition, the wireless device can perform coarse frequency and timing synchronization using the PSS and SSS. Since the wireless device knows the cell id, cyclic prefix, and location of subframe 0, the wireless device can make measurements on the CRS in subframes 0 and 5 as shown in step 715. Example measurements are the reference signal received power (RSRP), the received signal strength indicator (RSSI), and the reference signal received quality (RSRQ). The CRS can be used to improve frequency and timing synchronization. If the measurements indicate that the communications controller is satisfactory (in terms of received signal quality), the wireless device may choose to process the PBCH to determine other information such as the number of antenna ports over which the CRS is transmitted, the frame numbering (e.g., 0 to 1023), and the downlink bandwidth (bandwidth of the downlink carrier) as shown in step 720. The remaining steps in FIG. 7 show how the UE can become assigned to an eNB. In step 725, the UE listens to system information broadcast (SIB) messages, such as SIB1, SIB2, etc. Note to listen to SIB messages, the UE typically receives the PDCCH to process the downlink control information (DCI) to obtain the modulation, coding, etc. information for the PDSCH carrying the SIB message. In step 730, the UE may process more CRS for measurement purposes. In step 735, the UE may decide to "camp" on this carrier. In step 740, the UE may begin the random access procedure by transmitting the random access channel (RACH) on the uplink in order to enter the RRC_CONNECTED state in step 745. There may be message exchange in step 745 between the UE and eNB. UEs have two states: RRC_CONNECTED and RRC_IDLE; the term "connected" can represent RRC_CONNECTED while "idle" can represent "RRC_IDLE.

One concept to reduce the interference from eNBs without any UEs attached (assigned, camped) is to turn those eNBs off. When UEs arrive, the eNBs would then turn on. Likewise, when there is no more traffic, the eNBs could then turn off. However, there are many modifications to the standards in order to support the on-off mechanism (on/off adaptation) such as the UE identifying the quality of an eNB based on the persistent transmission of signals such as the PSS, SSS, and CRS; when those signals are absent, how the UE can measure the quality. Other questions include regarding small cell on/off adaptation, or more generally, network adaptation:

1. Coverage issue: ensuring cellular coverage despite of small cell on/off;
2. Idle UE issue: can small cell operating on/off support UEs in the idle state? What needs to be done to support idle UEs; in the connected state, can the UE/eNB exchange data;
3. Legacy UE support (how to support UEs that do not have this feature);
4. How may fast on/off adaptation be supported? More specifically, how may fast on/off adaptation be supported, given newly introduced procedures/mechanisms (in Rel-11/12 or even beyond) such as small cell discovery and measurement enhancements; dual connectivity or more broadly, multi-stream aggregation (MSA); CoMP and enhanced CoMP (eCoMP) (including CoMP Scenario 4 (a network with low power RRHs within the macrocell coverage where the transmission/reception points created by the RRHs have the same cell IDs as the macro cell), coordination over non-ideal backhaul); massive carrier aggregation; etc.

A small cell operating on/off adaptation or power adaptation frequently (e.g., in time scale shorter than hours) may not be suitable to support idle UEs because rapid adaptation can cause idle UE to enter cell reselection frequently and consume power. Similarly, they may not be suitable for coverage support that a macro cell can provide. Such a small cell may be mainly used to support active UEs' high traffic demand in addition to the basic functionalities provided by the coverage layer. The cells on the coverage layer may not perform on/off adaptation (at least they should not do so frequently). Idle UEs may be connected to coverage layer cells only. A consequence of this is that small cells do not have to be standalone cells at least from the perspective of legacy UEs. In certain isolated local areas, however, there may exist some scenarios where coverage is not a concern and high capacity is desirable; in such cases standalone small cells operating on/off may be deployed.

Therefore, typical deployment scenarios include a coverage layer whose cells do not perform network adaptation (or at least not too frequently or significantly), and capacity layer whose cells (mainly small cells) may perform network adaptation. Coverage/mobility and idle UE support are mainly provided by the coverage layer. Typically UEs connect to cells in the coverage layer first, and then connect to small cells in the capacity layer when needed. The small cells may be co-channel or non-co-channel with those in the coverage layer. One example deployment is shown in FIG. 1B.

In an embodiment, as one efficient way to deploy and operate the small cells, a virtual cell configuration (e.g., CoMP Scenario 4) is adopted, and the small cells are configured and turned on opportunistically for UEs with high traffic demand. Thus, in such a network, coverage and idle UE support are ensured and not affected by small cell adaptation.

Disclosed herein are mechanisms that enable potential small cell on/off transition time reduction include the introduction of discovery reference signal (DRS) and DRS-based measurements/synchronization, and the utilization of dual connectivity. These mechanisms may be used to facilitate the following procedures: handoff (or handover, HO), Scell addition/removal and activation/deactivation in CA, SeNB addition/removal and activation/deactivation in dual connectivity, and discontinuous reception (DRX).

It should be noted that the on/off state transitions of cells (or network points) are generally transparent to UEs. A UE may be signaled that it should monitor a cell's CRS (i.e., the cell is activated for the UE) or should not monitor a cell's CRS (i.e., the cell is deactivated for the UE), but the signaling is UE specific or UE-group specific. The UE generally does not have sufficient information to know if the cell experiences an on/off transition. More specifically, the UE knows the cell is on if the cell is activated for the UE, but the UE cannot infer the on/off state of the cell if the cell is deactivated for the UE.

Turning on/off a small cell for handover may occur in the following scenarios:

First, the target eNB (a small cell) is turning on. There are benefits to turn on a small cell and handover a UE to that cell. The channel conditions between the UE and that cell can be measured based on a DRS associated with that cell and reported before that cell is turned on, and the turning on can be triggered by arrival of traffic (either DL or UL) for the UE. Examples of a DRS can include the PSS, SSS, CRS, DMRS, CSI-RS, and even a new signal design. The DRS may comprise a subset of the overhead or just be a new signal. The DRS may be periodic, typically with a period greater than the rate at which the master information block changes (e.g. 40 ms). The periodicity DRS may also be related to a duty cycle with one part of the duty cycle, no DRS is transmitted. In the second part of the duty cycle, a set of DRS (one or more signals) can be transmitted in accordance to the frame configuration and a periodicity within that set.

Second, the source eNB (a small cell) is turning off. There are benefits to handover a UE to another cell and turn off a small cell. The turning off can be due to the completion of traffic, interference management, and load balancing/shifting reasons.

Figure 3A:
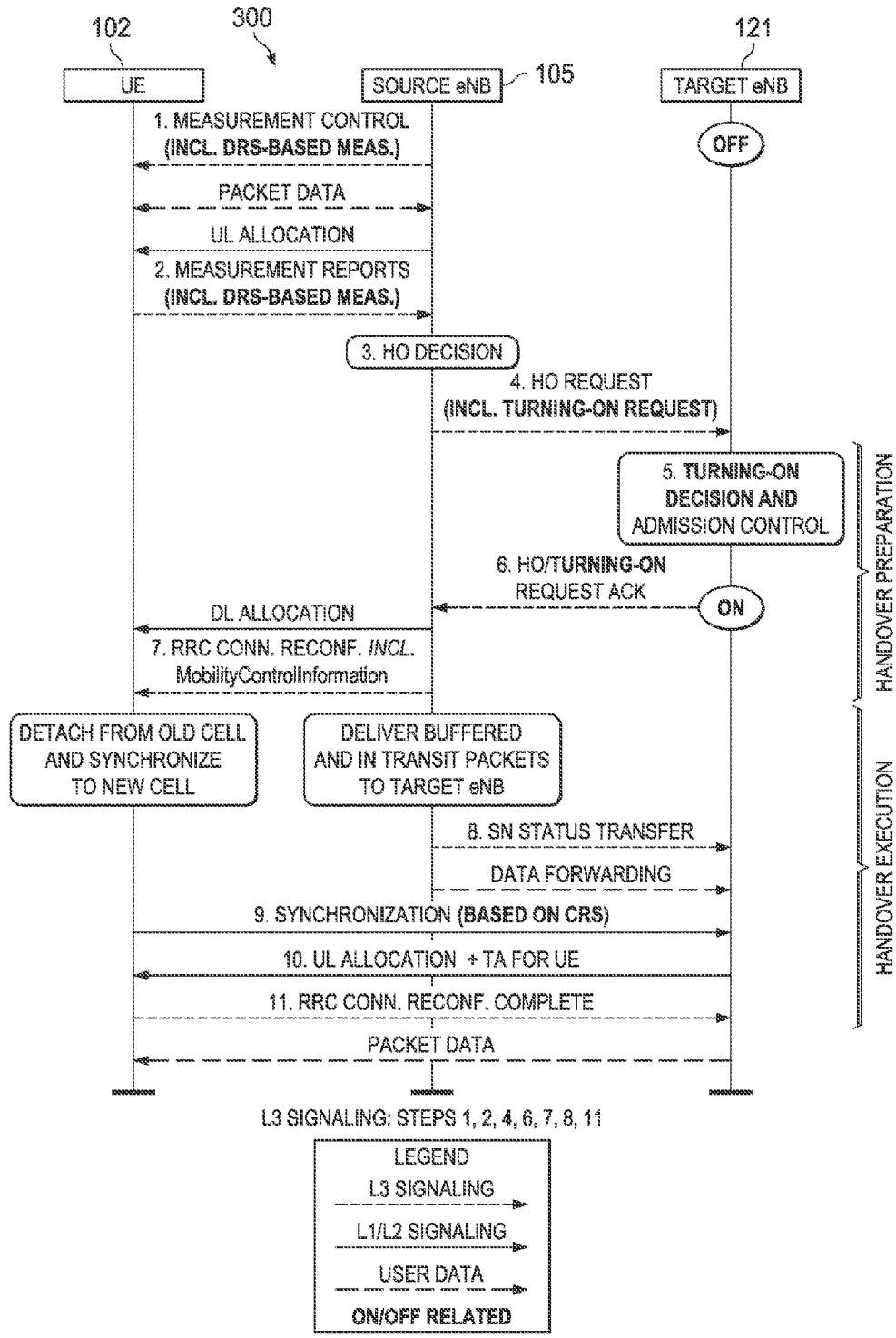
FIG. 3A illustrates an example embodiment of a method of handoff.

Some modifications are needed for HO procedure enhancements, mainly to incorporate the DRS and DRS-based measurements and the state transition of a small cell into the existing process. In FIG. 3A, an embodiment method 300 to enhance the existing HO procedure is illustrated for the scenario that the target eNB 306 is turning on (similar enhancements can be adapted for the other scenario). FIG. 3A shows an example way for HO enhancements for small cell on/off where the modifications are highlighted in green. The UE 102 performs measurements based on configured DRS (including the DRS transmitted by the target eNB 121 which is turned off) and reports to the network.

In more detail, the enhancements may include the following embodiments.

An embodiment is incorporating the DRS and DRS-based measurements for Step 1, Step 2, and Step 9 in FIG. 3A and illustrated using the scenario in FIG. 1B. In Step 1, source eNB 105 configures UE 102 with measurement objects including those based on the DRS. In Step 2, source eNB 105 receives measurement reports including those based on the DRS. Target eNB 121, though turned off before Step 6, can still be measured through its DRS transmitted during its OFF period. In Step 9, UE 102 may perform fine synchronization with target eNB 121 based on CRS. UE 102 may have already acquired coarse synchronization based on DRS (for example, based on the PSS transmitted during the DRS burst), and it can assume the CRS and DRS carry the same time/frequency and channel characteristics (quasi co-location). To this aim, the measurement objects in Step 1 are configured such that the DRS antenna port(s) and the CRS antenna port(s) (or equivalently, the physical cell id (PCID) associated with the CRS) are related by a quasi co-location assumption for time and frequency synchronization (average delay and Doppler shift).

An embodiment is incorporating the small cell state changes for Steps 4, 5, and 6 in FIG. 3A. As target eNB 121 is a turned-off small cell, the HO Request from source eNB 105 may also serve as a Turning-on Request in Step 4. In Step 5, a turning-on decision is made, the acknowledgement for both the HO Request and Turning-on Request is sent back to the source eNB 105. In the meantime, target eNB 121 is turning on. These steps may also involve a small cell cluster coordinator (e.g., macro eNB), in which case the information exchange may be different and will be described later.

Some more detailed measurements are given below. In an embodiment, the DRS configuration is signaled in the measurement object configuration signaling. The DRS configuration contains at least one or more of the following: the virtual cell id (VCID) associated with the DRS that may be used to generate the sequence for the DRS (e.g., the PSS and/or RS contained in the DRS); the PCID linked to the DRS that the UE may assume any port associated with the PCID is quasi co-located with the DRS port(s), and therefore the UE can utilize the information (e.g., time and frequency synchronization, average delay and Doppler shift, large-scale channel fading, etc.) obtained from DRS port(s) to other ports and vice versa; information about a non-zero-power CSI-RS (e.g., VCID of the CSI-RS) so that DRS-based measurements/synchronization can be used for the CSI-RS based measurements/synchronization, which may be useful if the target cell is not configured as a backward compatible cell for the UE; DRS subframe allocations and associated PSS subframe allocations (which may coincide in a subset of subframes but not necessarily in all subframes); DRS transmission power so that the UE may relate DRS-based measurements to CRS/CSI-RS based measurements; DRS transmission power offset relative to other RS transmission power so that the UE may relate DRS-based measurements to CRS/CSI-RS based measurements; DRS-based measurement power offset relative to other RS-based measurement power so that the UE may relate DRS-based measurements to CRS/CSI-RS based measurements; RACH resources and configurations associated with DRS so that the UE can transmit RACH signals to the cell, etc. While most of these configurations may be signaled at Step 1 in the measurement objects, some of them (e.g., the associated non-zero-power CSI-RS information, the associated RACH information) may be signaled at Step 7 when the network decides to HO the UE to the target cell. In addition, a DRS resource may include time, frequency, sequence, and carrier. The cells signaling the DRS configuration to the UE may be a subset of the cells sharing the same DRS configurations or some other cells, e.g., the macro cell. The cells receiving UE DRS measurement reports may be a subset of the cells sharing the same DRS configurations or some other cells, e.g. the macro cell.

When the UE performs the random access procedure to the target cell, the procedure can be based on RACH information provided in the Radio Resource Control (RRC) reconfiguration signaling and pathloss estimate/DL synchronization obtained from target cell DRS or CRS. In one embodiment, after the UE receives RRC reconfiguration signaling in Step 7, the UE detects the target eNB CRS and hence it can perform random access procedure based on timing obtained from CRS; note that the UE does not need to base its transmission power for the RACH signal on the CRS, i.e., the pathloss estimate can be obtained by the UE by $PL_c$=referenceSignalPowerDRS−higher layer filtered DRS RSRP, where referenceSignalPowerDRS is the DRS power signaled to the UE in DRS configuration for the cell or in the RRC reconfiguration signaling for the cell (for this purpose, the DRS and the target cell need to be linked, by linking the target cell ID and DRS ID, for example, or including the DRS ID in the HO RRC reconfiguration signaling), and higher layer filtered DRS RSRP is the RSRP measurement based DRS. In another embodiment, the UE does not detect the target eNB CRS or cannot detect the target eNB CRS (yet), and then it performs random access procedure based on timing and measurement obtained from DRS. The signaling of referenceSignalPowerDRS needs not be in the configuration of DRS or DRS-based measurement; it may be contained in RRC reconfiguration signaling when the cell associated with the DRS is added as a Scell/SeNB or becomes the target cell for HO. The may also be signaled as pathlossReferenceLinking similar to current Scell mechanism. The UE may need to further adjust its DL timing after the random access procedure and after it detects the target cell CRS. Similarly, the pathloss estimate computed based on DRS can also be used by the UE for other UL channels/signals, such as PUCCH/PUSCH/SRS power control.

In an embodiment, in addition to the measurement object configuration in the form of an RRC element:

```
CellsToAddMod ::=   SEQUENCE {
    cellIndex                    INTEGER (1..maxCellMeas),
    physCellId                   PhysCellId,
    cellIndividualOffset         Q-OffsetRange
}
``` which is used for CRS-based measurements. The cellIndex is configured per UE to index it serving cells so that the UE can keep track of the serving cells. The physCellId is the physical cell ID of the serving cell, taking value from 0 to 503 and is used for PSS/SSS/CRS sequences, etc. The cellIndividualOffset is the bias associated with this cell for evaluating triggering conditions for measurement reporting.

There can be another list for DRS-based measurements, including fields such as drsIndex (upper bounded by some maxDrsMeas), physCellId (e.g., PCID) and/or VCID for the DRS, cellIndividualOffset, drsResourceCfg in frequency/time domains. The UE performs DRS-based measurements according to these configurations. The index drsIndex can be used in signaling to add, modify, and remove a DRS-based measurement configuration. The value maxDrsMeas specifies the maximum number of DRS-based measurements for a UE; example values can be 8 (equal to maxCrsMeas), 10, 12, etc. For CRS-based measurements, specifying PCID (physCellId) is sufficient for an UE, but for DRS-based measurement, the DRS may be transmitted from a network point with a VCID and the point is controlled by a cell with a PCID, or the DRS may be generated based on a VCID associated with a PCID. At least the ID (PCID or VCID) used for DRS generation needs to be signaled. In an embodiment, the VCID and PCID are different and both are signaled, and the VCID is needed for performing the RRM measurement and synchronization, but PCID may be used by the UE in some situations to associate CRS-based measurements/synchronization with DRS-based measurements/synchronization. The association may be quasi-co-location of CRS ports and DRS ports. Alternatively, the association may be signaled in a separate signaling concerning the relations between DRS and other RS (e.g. CRS, DMRS, CSI-RS, or PSS/SSS, of the cell). The value cellIndividualOffset specifies the offset used when evaluating triggering conditions for measurement reporting, e.g. 3 dB. The field drsResourceCfg can contain information about DRS appearance in time/frequency domain, generally port/subframe period/subframe offset/bandwidth information and RE (k,l) information, such as CSI-RS antennaPortsCount/resourceConfig/subframeConfig if CSI-RS is contained in DRS, and PSS period/offset if PSS is contained, etc.

In an embodiment, in addition to the target cell configurations for HO, there may be fields to indicate the DRS transmission power levels for the associated drsIndexes. If the fields are present, the UE uses the corresponding RSRP and DRS transmission power to set its initial RACH power. The DRS may contain a signal using or reusing the design of CRS, CSI-RS, or eCSI-RS. Note that if CSI-RS is used, the transmission power signaling for CSI-RS needs to be modified. This is because in current design, CSI-RS power is signaled relative to PDSCH/CRS power of the cell. For the purpose of obtaining pathloss estimate of a cell not yet connected or a non-standalone cell, the CSI-RS transmission power may need to be signaled without referring to CRS power level or PDSCH power level. In an embodiment, if no CRS is associated with DRS according to, e.g., quasi-co-location relationship, the transmission power of signals and channels other than DRS may be specified relative to the DRS transmission power. For example, the power of non-zero-power CSI-RS in current standards is specified using Pc, a value relative to PDSCH power and hence relative to CRS power. With a non-fully-functional cell which does not have CRS, the DRS power may be signaled to UE, and the CSI-RS power assumed by the UE is signaled to the UE in terms of an offset to the DRS power.

In an embodiment, the target cell has no PCID. The VCIDs for the EPDCCH, DMRS, PDSCH, and/or PUSCH will be included in the target cell configurations for HO. The UE completes the HO procedures based on DRS and these VCIDs. This may be applied for Scell HO, SeNB HO, etc.

An embodiment for cell state changes is to have separate signaling for Turning-on Request and HO Request. Similarly, Turning-on Request ACK/NACK and HO Request ACK/NACK can be separate. For example, when the target cell sends the HO Request ACK (acknowledgement), it still remains OFF. Then the source cell sends RRC signaling to the UE to start the HO process, which may take some time (about 100-200 ms) and the target cell can still remain OFF to reduce interference. In an embodiment the source cell, after reconfiguring UE's RRC connection, sends the Turning-on Request to the target cell followed by the target cell turning on and replying with Turning-on Request ACK.

Figure 3B:
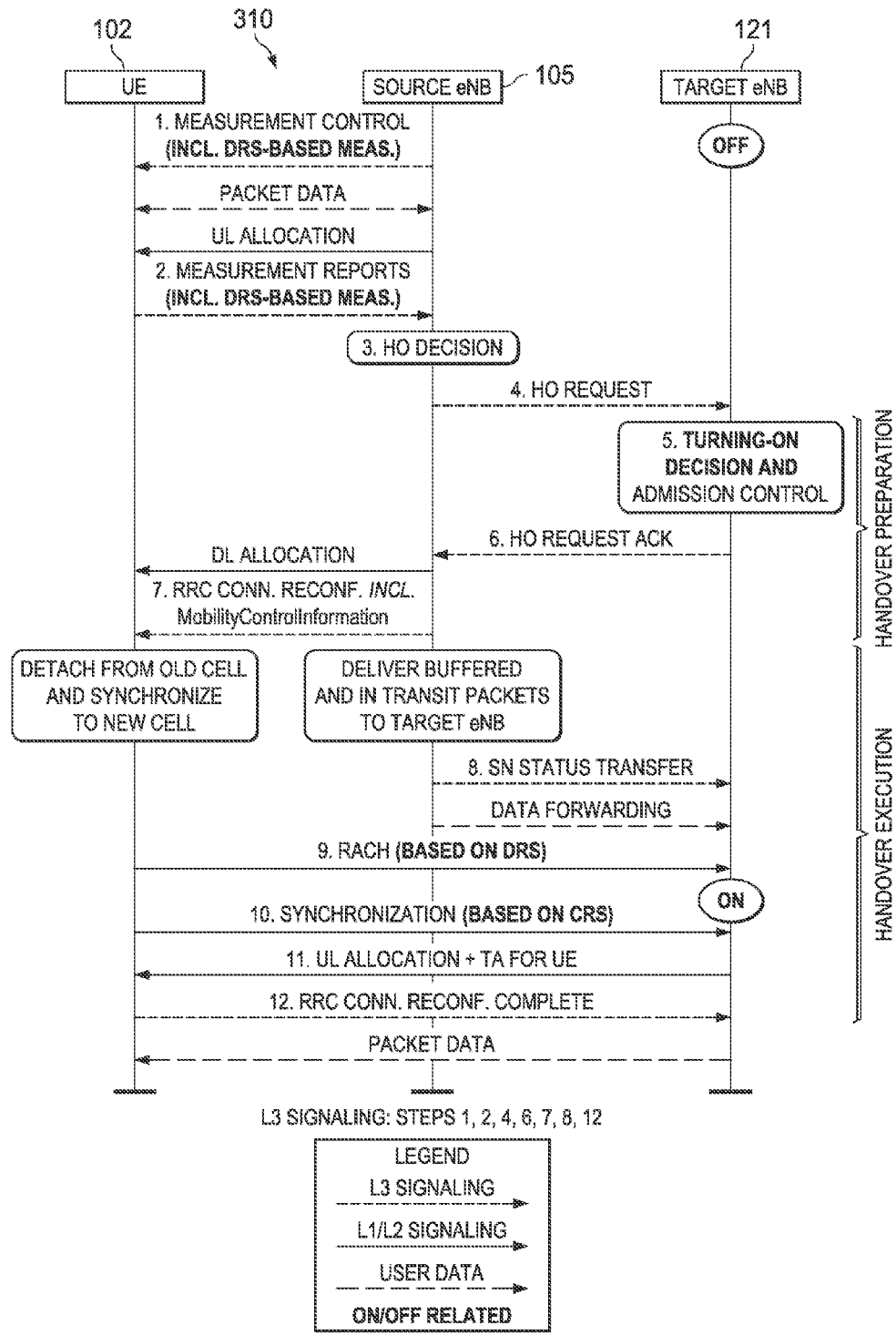
FIG. 3B illustrates another example embodiment of a method of handoff.

In another embodiment, the UE performs random access procedure to the target cell based on RACH information provided in the RRC reconfiguration signaling and pathloss estimate/DL synchronization obtained from target cell DRS. The RACH serves as a Turning-on Request and the target cell turns on. This method 310 is illustrated in FIG. 3B where the target eNB 121 remains OFF until it receives RACH from UE 102. The target cell subframe timing may be specified in the RRC reconfiguration for the UE to RACH, or the RACH opportunity is specified based on source cell subframe timing. The target cell also needs to inform other network entities about its status transition. This affects the RACH message (msg) 1 behavior but does not affect later messages. The UE 102 should know that there may not be any target cell CRS until it sends RACH. An advantage is that the target eNB 121 can remain in OFF state until it receives RACH and it can cause less interference. Without this mechanism, the target eNB 121 may have to be turned on a few hundred milliseconds earlier since the backhaul delay between the target eNB 121 and source eNB 105 ranges from a few milliseconds to a hundred milliseconds (in Step 6) and the RRC signaling delay ranges from a few tens milliseconds to a few hundred milliseconds (in Step 7); such delays are largely uncertain and hence the target eNB 121 may need to be turned on earlier than it needs to. This embodiment can also be adopted for Scell addition, Scell activation, SeNB addition, SeNB activation.

In yet another embodiment, a coordination entity communicates the HO Request and/or Turning-on Request with the target cell, and upon receiving such requests the target cell has to follow the requests and sends acknowledgements. Some embodiments will be provided later.

Similar to the HO case, CA activation/deactivation with small cell on/off may be performed depending on traffic events, interference conditions, and load balancing/shifting purposes. The enhancements may include:

Incorporating the DRS and DRS-based measurements. This is generally similar to the enhancements stated for the HO case. Note that it may be specified that the UE relies on DRS, as opposed to CRS, for measurements of a deactivated Scell; the UE makes no assumption that the CRS of the deactivated Scell shall be present until the Scell becomes activated.

Enhanced activation/deactivation: When a small cell configured as a Scell is turning on or off, activation/deactivation signaling may need to be sent to multiple UEs connected with it. The UE-specific activation/deactivation procedure and signaling may not be the most efficient. Therefore, the activation/deactivation mechanism may be further improved to reduce the transition time, for example, the activation/ deactivation may be sent to a group of UEs using physical layer signals. However, the likelihood of activating a cell for all UEs at the same time is small, so in most cases the per-UE activation may be used. In contrast, when a cell needs to turn off, it needs to inform all the UEs (except for those already deactivated from the cell) and hence a group deactivation may be needed. A group deactivation signaling requires a group radio network temporary identifier (RNTI), which can be a RNTI specific for the cell. This cell-specific RNTI may be signaled to UEs via RRC signaling when the UEs gain access to the cell. If the UE detects the cell-specific RNTI in (E)PDCCH from a Scell or Pcell or MeNB and finds the deactivation message, it will deactivate from the cell. The group RNTI may also be used for activation (though less preferred); for example, the network decides to turn on the cell if a majority number of UEs are having traffic, in this case it may be more efficient (from the network point of view) to use the group activation to activate the cell for all UEs and later deactivates only a small portion of UEs without any traffic one by one.

Figure 4:
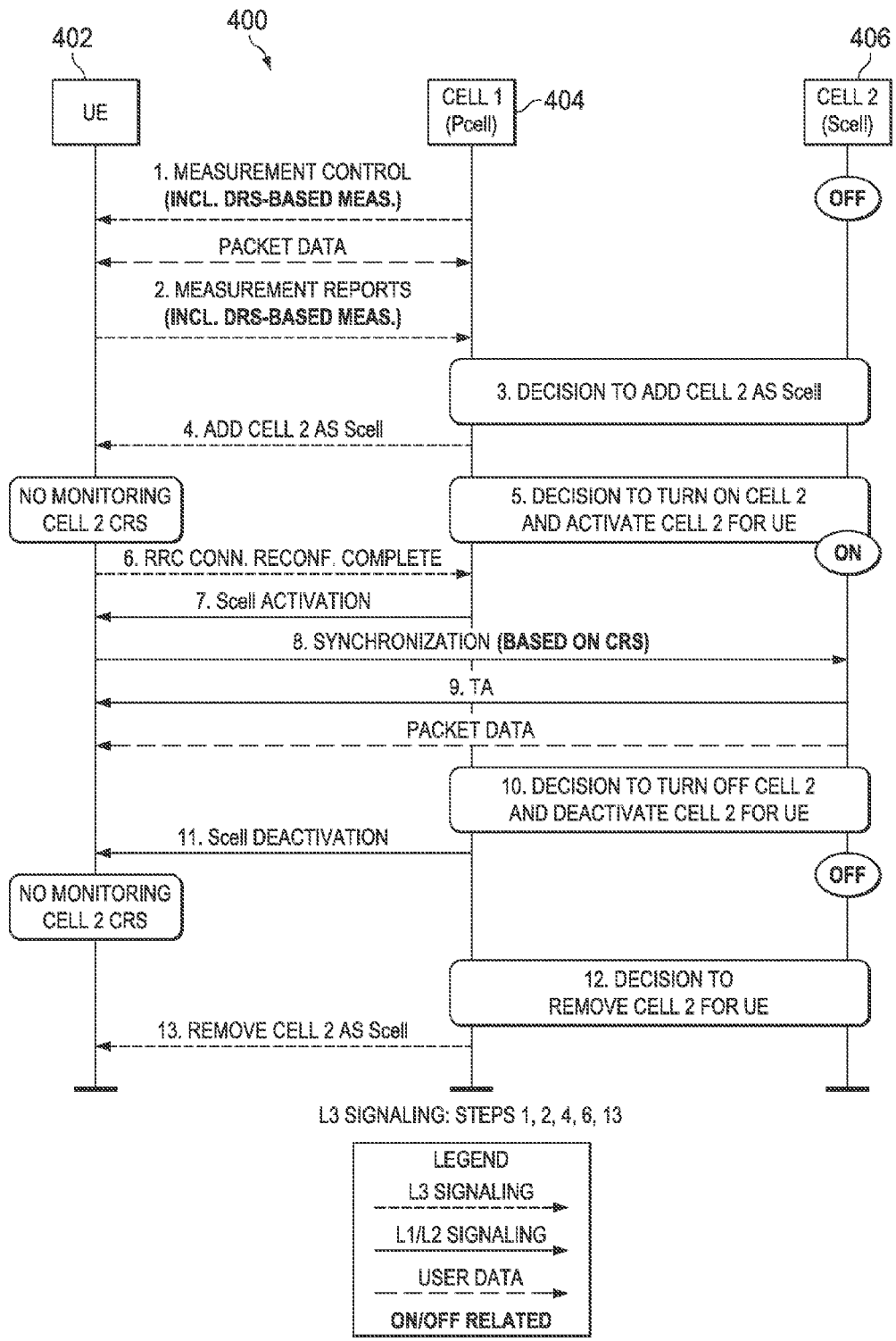
FIG. 4 illustrates an example embodiment of a method for carrier aggregation.

CA Scell addition/removal procedures with small cell on/off can also be enhanced in a way similar to the HO case as shown by method 400 in FIG. 4.

The enhancements for dual connectivity related enhancements may include incorporating the DRS and DRS-based measurements, which is generally similar to the enhancements stated before, and introducing SeNB activation/deactivation. If activation/deactivation can be supported in dual connectivity, the handover procedure or configuring/releasing of a SeNB may be replaced by activation/deactivation in some cases, and significant transition time reduction can be achieved to facilitate small cell on/off. Upon receiving the SeNB deactivation signaling from either the SeNB or MeNB, a UE 402 stops monitoring all cells in the SeNB (i.e., Secondary Cell Group, SCG) except for the configured DRS associated with the SCG. If no UE 402 monitors the SeNB, the SeNB can be turned off. The SeNB can be activated and turned on if it needs to serve UE(s). SeNB activation/ deactivation may be called as SCG (SeNB cell group) activation/deactivation instead. For a UE 402, there may be Pcell-like cell 404 in SCG. If this cell is deactivated, then the eNB is deactivated.

There is a study item examining carrier activation/deactivation within the SCG, but there is no support for SeNB activation/deactivation. If turning on/off the SeNB is needed, the SeNB configuration for the UE 402 has to be added/released before the turning on/off. The on/off transition time can be reduced by SeNB activation/deactivation mechanism as described above.

The SeNB deactivation signaling may be sent by MeNB or SeNB; the MeNB can just deactivate the Pcell-like cell 404 in the SCG to deactivate the entire cell group, while the SeNB can reuse the bitmap deactivation signaling to deactivate all cells including itself. The SeNB may also be deactivated based on a SeNB inactive timer, which is similar to sCellDeactivationTimer in CA but is for the activities of the entire SCG. The SeNB may also be deactivated based on SeNB DRX inactive timer (drx-InactivityTimer for SeNB).

The SeNB activation signaling may be sent by MeNB or SeNB. In one embodiment, the SeNB, when deactivated, cannot transmit any signals to the UE 402 until a DRS burst, but the SeNB may send the activation signaling to the UE 402 during a DRS burst of the Pcell-like cell 404 of the SeNB. The activation signaling can reuse the bitmap activation signaling to activate one or more cells at least including the Pcell-like cell 404. Other legacy signals/ channels, such as paging/control information, may also be carried during a DRS burst. Another embodiment is that the MeNB can send the activation signaling to the UE 402; however, the coordination between the MeNB and SeNB is needed prior to the activation. These embodiments can achieve different tradeoffs between flexibilities and complexity.

Yet another embodiment for SeNB activation is that a UE 402 sends a UL signal to the SeNB. The UL signal may be a RACH or other UL signal. The UL signal may be initiated by the MeNB or by the UE 402 itself. The MeNB may send a PDCCH order to request the UE 402 sends a RACH to the SeNB. Note that for existing mechanism, a PDCCH order from a cell triggers a RACH to the cell, but here, the PDCCH order triggers a RACH to another cell. Therefore, the PDCCH order from the MeNB needs to contain an indicator to specify if the PDCCH order is for MeNB or SeNB. The RACH sequence and the RACH opportunity may be specified in the PDCCH order and hence the SeNB can detect the RACH with less overhead. General RACH configurations can be signaled from either the MeNB or the SeNB via RRC signaling before this to occur. The RACH, or scheduling request, may also be initiated by the UE 402 if the UE 402 has UL data to transmit. In either case, the UE 402 starts to monitor the Pcell-like cell 404 of the SeNB, such as CRS, PDCCH, EPDCCH, or RAR, after the RACH is sent. If any of these signals are detected, the SeNB is considered as activated.

Besides, the SeNB activation/deactivation signaling may be sent to a group of UEs 402 using physical layer signals for higher efficiency. In general, the SeNB activation/deactivation mechanism and signaling may be similar to CA Scell 406 activation/deactivation, but the signaling is eNB or cell group specific, not cell specific; in other words it applies to all cells associated with the eNB or cell group.

To facilitate small cell on/off involving Scell 406 (of CA) and SeNB (of dual connectivity) activation/deactivation, as stated before, UE 402 behavior may need to be specified. A UE 402 relies on DRS, as opposed to CRS, for measurements of a deactivated Scell 406/SeNB. The UE 402 makes no assumption that the CRS of the deactivated Scell 406/SeNB shall be present until the Scell 406/SeNB becomes activated.

In addition, to facilitate small cell on/off, a UE 402 in DRX may also monitor only the DRS of its serving cell(s); effectively, the UE 402 is assumed to be deactivated from its serving cell(s). This leads to unified UE 402 behavior (i.e., monitoring DRS only) when it is deactivated from its Scell 406/SeNB or enters DRX. Effectively, the DRS cycle and DRX cycles are aligned or DRX cycle is a multiple of the DRS cycle.

For a virtual cell configured to a UE 402 without PCID or CRS, the UE 402 stops monitoring CSI-RS when the cell is deactivated or when the UE 402 enters DRX.

UE 402 should not know the on/off status of eNB; it should only know whether it should monitor the cell CRS.

When it is deactivated from a cell, or it enters DRX, then it does not monitor CRS. For a deactivated cell, the UE 402 monitors DRS bursts only, unless there is no DRS configured for the UE 402.

Figure 5A:
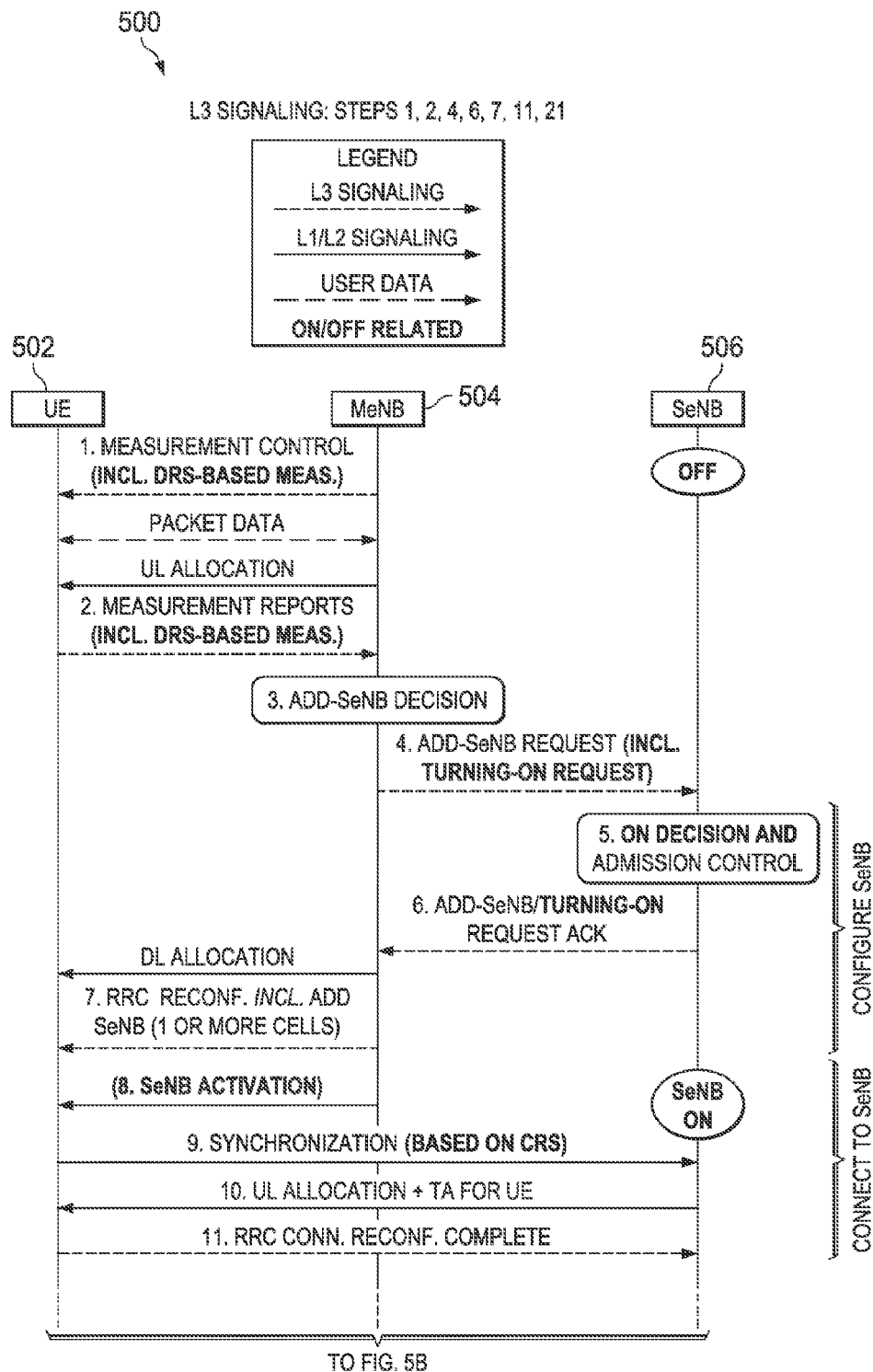
FIGS. 5A &5B illustrate an embodiment system for the case of SeNB activation/deactivation.
Figure 5B:
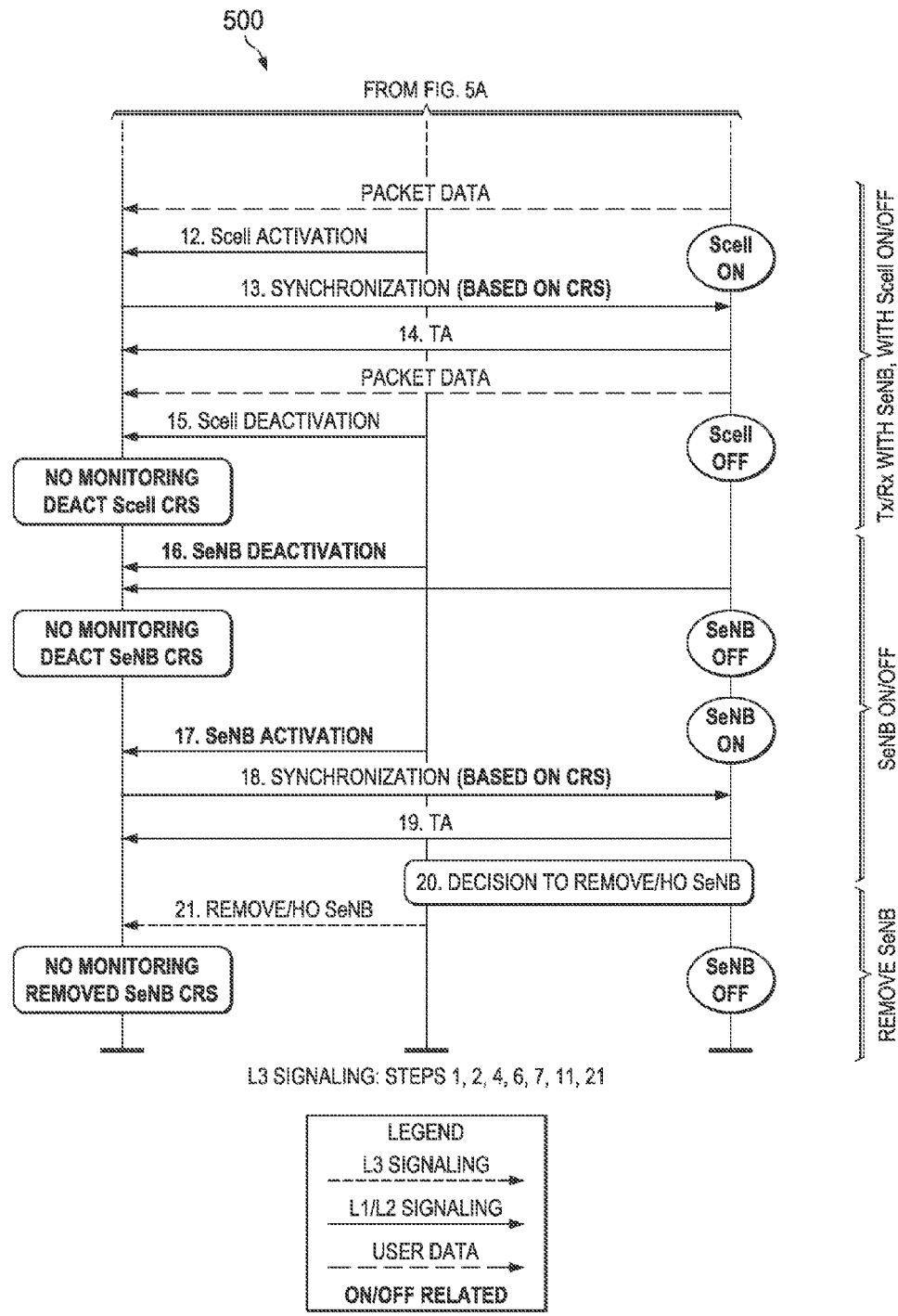

FIGS. 5A and 5B illustrate an embodiment system 500 for the case of SeNB activation/deactivation. Note that, in an embodiment, 502 is a UE in dual connectivity with an MeNB 504 and an SeNB 506; see also FIG. 1E for an illustration of the dual connectivity system diagram. This can be similarly applied to DRX in Pcell, or "deactivation" from the Pcell. However, the activation signaling for the Pcell of the MeNB can only come during the DRX burst of the Pcell.

In an embodiment, the DRX cycle is a multiple of the DRS cycle. For example, DRS may appear every 40 ms, and DRX may be configured as once every 4 DRS occurrences (i.e., with periodicity 160 ms). In each DRX on duration, there may be signals/channels transmitted in addition to DRS, including one or more of CRS, PDCCH, activation signaling, paging, systeminfomodification, etc. The DRX on duration may be specified as the length of the DRS burst, but it may be different for legacy UEs and new UEs. For example, the legacy UEs which monitor the cell every subframe when they are not in DRX can be put in DRX mode most of the time (to enable cell turning off) and rely on DRX on duration for sporadic data transmissions. The short and long DRX cycles may be configured to be compatible with DRS cycle. An activation signaling may be carried in PDCCH of the on duration, which can be used to activate one or more component carriers (for example, the Pcell-like cell in SeNB) of the cell group. The signaling can reuse the current Activation/Deactivation MAC control element. Alternatively, CRS may not be transmitted in the on duration; instead, EPDCCH and associated DM-RS may be transmitted, and the UE performs demodulation of EPDCCH based on DM-RS and the timing obtained from DRS.

Exchange of activation/deactivation information is needed at the network side. For example, MeNB needs to know SeNB on/off state. The MeNB knows if it fully controls SeNB on/off, or the SeNB signals its state to the MeNB, or a UE reports to MeNB about SeNB state changes (for example, through UE reporting UE state changes). On the other hand, the MeNB may need to know UE state (DRX or not) with the SeNB. For this purpose, the SeNB can signal the UE state or UE state change to the MeNB, or the UE reports to MeNB about its state changes. However, non-ideal backhaul delay may cause misunderstanding of the states between the MeNB and SeNB.

In an embodiment, a coordination entity with fast connections to MeNB and SeNB is included. This entity may (or may not) be co-located with the MeNB. In an embodiment, only essential control signaling with low payloads can be allowed to send over the connections, for example, SeNB on/off decision, SeNB on/off request, packet arrival/completion information, and UE state information. Such information is viewed as delay-sensitive data and is sent with higher priority in one embodiment.

Figure 6:
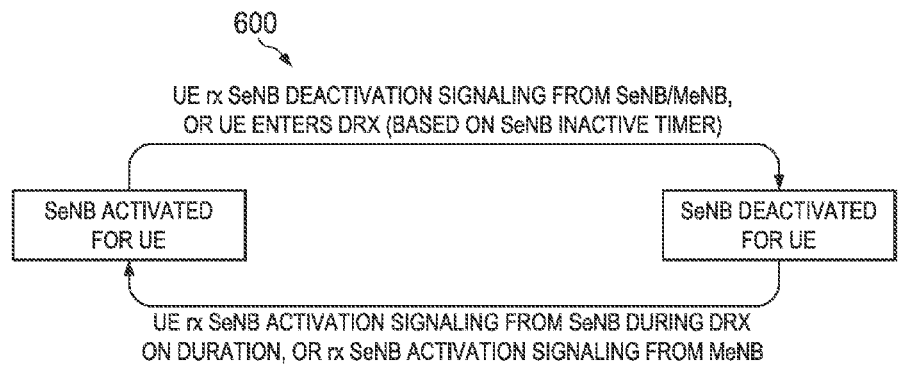
FIG. 6 illustrates an example embodiment of a method for dual connectivity.

In an embodiment, idle UEs are prevented to camp under a small cell operating fast on/off. To this aim, the small cell may alter or remove certain signals/channels in the current initial access procedure so that idle UEs cannot complete the procedure. The current initial access procedure 600 is shown in FIG. 6. UE receives SeNB deactivation signaling from SeNB/MeNB when the SeNB is deactivated or when UE enters DRX (based on SeNB inactivity timer). The UE receives SeNB activation signaling from the SeNB during DRX based on duration or receives SeNB activation signaling from the MeNB when the SeNB is activated.

In an embodiment, the PCID of the small cell is blacklisted in the SIB. The blacklisted PCID needs to be transmitted by cells in the same carrier and different carriers. A UE can still access this cell if a measurement object is configured for measurement of the cell. If the measurement object configures CRS-based measurement associated with a PCID, the UE performs the measurement regardless of the blacklist; likewise, if the measurement object configures DRS-based measurement associated with a PCID, the UE performs the measurement regardless of the blacklist. In an embodiment, DRS-based measurement does not need to be configured by the network, and the UE shall assume the blacklist only prevents CRS-based measurements of the blacklisted PCIDs and does not apply to DRS-based measurements.

In an embodiment, a fast on/off small cell does not transmit all signals/channels needed for initial access. For example, the cell does not transmit SSS, or it does not transmit PBCH. A UE can still be handed over to this cell, since the synchronization information and MIB information can be configured to the UE by its source cell via RRC signaling. Similarly, the cell can be added as a Scell or a cell in a SeNB, and relevant information can be carried by Pcell or MeNB's RRC signaling (higher layer signaling).

In an embodiment, a fast on/off small cell does not have a PCID, i.e., it is not a standalone cell. Then UEs will not camp under the small cell. A UE can connect to the cell through CoMP-type procedures. However, HO or CA or dual connectivity procedure cannot be supported by such a cell.

In an embodiment, a slow-on/off small cell may still allow idle UE to camp under it during its ON period. System information (SI) update may be indicated to UEs to inform that the cell is now blacklisted or turned off, or the cell is removed from blacklist. Alternatively, the network may not signal/configure anything and it relies on idle UE performing cell reselection (which does not occur frequently).

To support small cell on/off, it is sufficient if only the cells operating on/off need to transmit DRS. Cells not operating on/off generally have CRS transmitted and can be discovered by any UE. However, for the purpose of discovering more cells, it may be desirable to have some cells transmit DRS even if they transmit CRS all the time. For such cells, the RRM measurements and synchronization can be based on CRS instead of DRS.

One issue that needs clarification is the relation between DRS and CRS. The UE can have information to know if a measurement is based on DRS or CRS since the configured measurement objects can be different for them. For example, DRS measurements may be signaled with bandwidth information, measurement duration different from CRS, etc. DRS-based measurements may contain more than one RSRQ for a carrier, and the corresponding RSSI resources or interference measurement resources may be specified. For DRS and CRS associated with the same PCID, the UE can infer the information about one based on the information about the other. For example, during the HO Step 9 in FIG. 3A, the UE does not have to perform synchronization to the target cell based on CRS from the beginning; rather, it can use DRS-based timing to initialize and corroborate the CRS-based synchronization. Similarly this procedure can be applied for the RSRP measurements. At the moment the cell is turning off, the UE can use the CRS-based timing/measurements to initialize and corroborate the DRS-based timing/measurement as the CRS-based are generally more accurate. Then the relation between CRS and DRS needs to signaled, such as their power offset, their corresponding measurement power offset, etc. The UE may need to perform the conversion from one to the other (as opposed to solely relying on the network to perform the conversion); for example, in order to check measurement event trigger conditions for DRS-based measurements, the UE needs to convert (or a set of new conditions needs to be defined for DRS). (However, for measurement reporting, the UE may or may not convert depending on specification; either works but the standards specification should mandate.) For another example, if the UE needs to perform RACH to a turned-off cell based on DRS, it needs to know the DRS transmission power to find out the pathloss estimate. If the cell that the UE is RACH to has no CRS, the related CSI-RS information and DMRS information (e.g., port information, sequence information, time/frequency resources, etc.) need to signaled for the DRS. When a UE monitors CRS, such as when it is connected to a cell transmitting CRS or its Scell/SeNB is activated, the UE should base its behavior on CRS of the cell and not the DRS of the cell.

Figure 8:
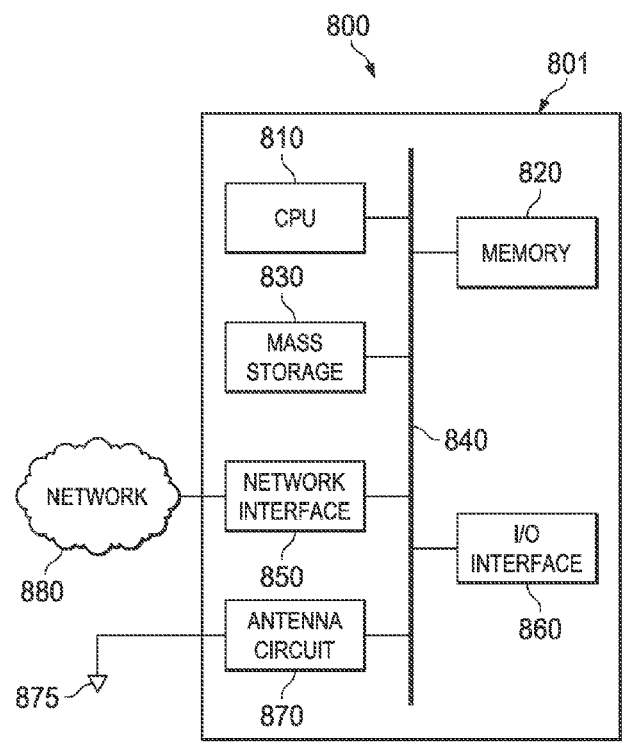
FIG. 8 illustrates a computing platform that may be used for implementing, for example, the devices and methods described herein, in accordance with an embodiment.

FIG. 8 is a block diagram of a processing system 800 that may be used for implementing the devices and methods disclosed herein. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 800 may comprise a processing unit 801 equipped with one or more input/output devices, such as a speaker, microphone, mouse, touchscreen, keypad, keyboard, printer, display, and the like. The processing unit 801 may include a central processing unit (CPU) 810, memory 820, a mass storage device 830, a network interface 850, an I/O interface 860, and an antenna circuit 870 connected to a bus 840. The processing unit 801 also includes an antenna element 875 connected to the antenna circuit.

The bus 840 may be one or more of any type of several bus architectures including a memory bus or memory controller, a peripheral bus, video bus, or the like. The CPU 810 may comprise any type of electronic data processor. The memory 820 may comprise any type of system memory such as static random access memory (SRAM), dynamic random access memory (DRAM), synchronous DRAM (SDRAM), read-only memory (ROM), a combination thereof, or the like. In an embodiment, the memory 820 may include ROM for use at boot-up, and DRAM for program and data storage for use while executing programs.

The mass storage device 830 may comprise any type of storage device configured to store data, programs, and other information and to make the data, programs, and other information accessible via the bus 840. The mass storage device 830 may comprise, for example, one or more of a solid state drive, hard disk drive, a magnetic disk drive, an optical disk drive, or the like.

The I/O interface 860 may provide interfaces to couple external input and output devices to the processing unit 801. The I/O interface 860 may include a video adapter. Examples of input and output devices may include a display coupled to the video adapter and a mouse/keyboard/printer coupled to the I/O interface. Other devices may be coupled to the processing unit 801 and additional or fewer interface cards may be utilized. For example, a serial interface such as Universal Serial Bus (USB) (not shown) may be used to provide an interface for a printer.

The antenna circuit 870 and antenna element 875 may allow the processing unit 801 to communicate with remote units via a network. In an embodiment, the antenna circuit 870 and antenna element 875 provide access to a wireless wide area network (WAN) and/or to a cellular network, such as Long Term Evolution (LTE), Code Division Multiple Access (CDMA), Wideband CDMA (WCDMA), and Global System for Mobile Communications (GSM) networks. Additional, in some embodiments, the antenna circuit 870 operates in Full Duplex (FD) mode. In some embodiments, the antenna circuit 870 and antenna element 875 may also provide Bluetooth and/or WiFi connection to other devices.

The processing unit 801 may also include one or more network interfaces 850, which may comprise wired links, such as an Ethernet cable or the like, and/or wireless links to access nodes or different networks. The network interface 801 allows the processing unit 801 to communicate with remote units via the networks 880. For example, the network interface 850 may provide wireless communication via one or more transmitters/transmit antennas and one or more receivers/receive antennas. In an embodiment, the processing unit 801 is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method in a network component for communicating with user equipment (UEs), the method comprising:
   accessing, by the network component, at least one reference signal (RS) transmission parameter, the at least one RS transmission parameter including a physical cell identity (PCID) of the network component and a configurable scrambling ID of the network component;
   generating, by the network component, a first RS according to the PCID and the configurable scrambling ID, and a common reference signal (CRS) according to only the PCID;
   transmitting, by the network component, the first RS and the CRS to the UE when the network component is on and activated for the UE; and
   transmitting, by the network component, the first RS without the CRS to the UE when the network component is on and deactivated for the UE, wherein the first RS enables the UE to make RS-based radio resource management (RRM) measurements according to the first RS, wherein the first RS is transmitted not more frequently than once every other subframe, wherein the CRS is transmitted every subframe when the network component is on and activated for the UE.

2. The method of claim 1, wherein the first RS is transmitted periodically.

3. The method of claim 1, wherein the first RS is transmitted according to timing information specified from the RS transmission parameter.

4. The method of claim 1, wherein the first RS is transmitted periodically during a time period specified by the RS transmission parameter.

5. The method of claim 4, wherein the time period includes a duration of one to five consecutive subframes.

6. The method of claim 4, wherein the time period includes a duration of two to five consecutive subframes.

7. The method of claim 4, wherein the first RS comprises CRS on antenna port o in all downlink subframes and in DwPTS of all special subframes in the time period.

8. The method of claim 4, wherein the first RS comprises a primary synchronization signal (PSS) in a first subframe or a second subframe of the time period.

9. The method of claim 4, wherein the first RS comprises a secondary synchronization signal (SSS) in a first subframe of the time period.

10. The method of claim 4, wherein the first RS comprises CRS on antenna port o in all downlink subframes and in DwPTS of all special subframes in the time period, a primary synchronization signal (PSS) in a first subframe or a second subframe of the time period, and a secondary synchronization signal (SSS) in a first subframe of the time period, wherein the CRS, the PSS, and the SSS are generated using a physical cell identity.

11. The method of claim 4, wherein the first RS comprises non-zero-power channel state information reference signals (CSI-RS) in zero or more subframes in the time period.

12. The method of claim 11, wherein the CSI-RS is generated using a scrambling identity.

13. The method of claim 4, wherein the first RS includes channel state information (CSI) reference signals corresponding to the configurable scrambling ID, and a PSS/SSS/CRS corresponding to the PCID, wherein the CSI reference signals and the PSS/SSS/CRS are quasi co-located with respect to average delay and Doppler shift.

14. A network component in a wireless network for providing network access to a user equipment (UE), comprising:
   a transmitter configured to transmit a first reference signal (RS) and a common reference signal (CRS) to the UE;
   a receiver configured to receive at least one RS transmission parameter, the at least one RS transmission parameter including a physical cell identity (PCID) of the network component and a configurable scrambling ID of the network component; and
   a processor and memory coupled to the transmitter and the receiver, wherein the processor and memory are configured to cause the transmitter to transmit the first RS and the CRS to the UE when the network component is in an on state and is in an active state for the UE, wherein the processor generates the first RS according to the PCID and the configurable scrambling ID, wherein the processor generates the CRS according to only the PCID, wherein the processor and memory are configured to cause the transmitter to transmit the first RS without the CRS to the UE when the network component is in the on state and is in a deactivated state for the UE, wherein the processor and memory are configured to cause the transmitter to transmit the first RS to the UE not more frequently than once every other subframe, and wherein the processor and memory are configured to cause the transmitter to transmit the CRS to the UE every subframe when the network component is in the on state and is in the active state for the UE.

15. The network component of claim 14, wherein the first RS is transmitted periodically.

16. The network component of claim 14, wherein the first RS is not transmitted during a first part of a duty cycle and a first RS burst is transmitted in a second part.

17. The network component of claim 14, wherein the first RS is transmitted according to timing information specified from the RS transmission parameter.

18. The network component of claim 14, wherein the first RS is transmitted periodically during a time period specified by the RS transmission parameter.

19. The network component of claim 18, wherein the time period includes a duration of one to five consecutive subframes.

20. The network component of claim 18, wherein the time period includes a duration of two to five consecutive subframes.

21. The network component of claim 18, wherein the first RS comprises cell-specific reference signals on antenna port o in all downlink subframes and in DwPTS of all special subframes in the time period.

22. The network component of claim 18, wherein the first RS comprises a primary synchronization signal in a first subframe or a second subframe of the time period.

23. The network component of claim 18, wherein the first RS comprises a secondary synchronization signal in a first subframe of the time period.

24. The network component of claim 18, wherein the first RS comprises non-zero-power channel state information (CSI) reference signals in zero or more subframes in the time period.

25. The network component of claim 18, wherein the first RS includes information about at least one of time and frequency synchronization, average delay, Doppler shift, QCL, and large-scale channel fading.

26. A network controller to coordinate communications between user equipment (UE) and a network component, comprising:
   a transmitter configured to signal the UE and the network component; and
   a processor and memory coupled to the transmitter, wherein the processor and memory are configured to cause the transmitter to transmit configuration information to the UE, wherein the configuration information provides the UE with an active time frame within which the UE is to expect a common reference signal (CRS) from a network component, a deactivation time frame within which the UE is not to expect the CRS, and information for receiving and processing a first reference signal (RS) from the network component, wherein the processor and memory are further configured to cause the transmitter to transmit network component transmit parameters to the network component, wherein the transmit parameters include an on/off parameter, an activation/deactivation parameter, and at least one RS transmission parameter, wherein the at least one RS transmission parameter for the RS includes a physical cell identity (PCID) of the network component and a configurable scrambling ID of the network component, wherein the transmit parameters instruct the network component to generate the first RS according to the PCID and the configurable scrambling ID, wherein the transmit parameters instruct the network component to generate the CRS according to only the PCID, wherein the transmit parameters instruct the network component to transmit the first RS and the CRS to the UE during time periods in which the network controller specifies the network component to be on and activated for the UE, wherein the transmit parameters instruct the network component to transmit no signals except the RS to the UE during time periods in which the network controller specifies the network component to be on and deactivated for the UE.

27. The method of claim 1, wherein the first RS enables the UE to make RS-based radio resource management (RRM) measurements with a secondary cell (Scell) controlled by the network component according to the first RS.

28. The method of claim 27, wherein the network component is a secondary nodeB (SeNB).

29. The method of claim 1, wherein the accessing the at least one reference signal (RS) transmission parameter comprises:
   receiving, at the network component, the at least one reference signal (RS) transmission parameter from a network controller.

* * * * *